United States Patent
Chhabra et al.

(10) Patent No.: US 11,394,531 B2
(45) Date of Patent: Jul. 19, 2022

(54) OVERHEAD REDUCTION FOR LINK PROTECTION

(71) Applicant: Intel Corporation, Santa Clara, CA (US)

(72) Inventors: Siddhartha Chhabra, Portland, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 16/657,902

(22) Filed: Oct. 18, 2019

(65) Prior Publication Data

US 2020/0052892 A1    Feb. 13, 2020

Related U.S. Application Data

(60) Provisional application No. 62/873,635, filed on Jul. 12, 2019.

(51) Int. Cl.
*H04L 9/06* (2006.01)
*H04L 9/08* (2006.01)
*H04L 9/32* (2006.01)

(52) U.S. Cl.
CPC .......... *H04L 9/0819* (2013.01); *H04L 9/0631* (2013.01); *H04L 9/0637* (2013.01); *H04L 9/0662* (2013.01); *H04L 9/321* (2013.01); *H04L 9/3242* (2013.01)

(58) Field of Classification Search
CPC . H04L 9/08; H04L 9/0819; H04L 9/06; H04L 9/0631; H04L 9/0662; H04L 9/32; H04L 9/321; H04L 9/0637; H04L 9/3242; H04L 2209/125; H04L 2209/80; G06F 21/62; G06F 21/78
See application file for complete search history.

(56) References Cited

U.S. PATENT DOCUMENTS

| | | | |
|---|---|---|---|
| 2006/0126835 A1* | 6/2006 | Kim | H04L 9/3242 380/44 |
| 2008/0208758 A1* | 8/2008 | Spiker | G06Q 20/3829 705/70 |
| 2008/0288780 A1 | 11/2008 | Beukema et al. | |
| 2010/0027783 A1* | 2/2010 | Yup | H04L 9/0643 380/44 |

(Continued)

FOREIGN PATENT DOCUMENTS

WO   2007060587 A1   5/2007

OTHER PUBLICATIONS

Extended European Search Report dated Sep. 25, 2020 for EP Application No. 20162935.9, 7 pages.

*Primary Examiner* — Shaqueal D Wade-Wright
(74) *Attorney, Agent, or Firm* — Schwabe, Williamson & Wyatt, P.C.

(57) ABSTRACT

Systems, apparatuses, methods, and computer-readable media are provided for reducing or eliminating cryptographic waste for link protection in computer buses. In various embodiments, data packets are encrypted/decrypted in accordance with advanced encryption standard (AES) Galois counter mode (GCM) encryption/decryption. Monotonically increased counter values are used as initialization vectors; and/or accumulated MAC is practiced to reduce or eliminate cryptographic waste. Other related aspects are also described and/or claimed.

10 Claims, 12 Drawing Sheets

(56) References Cited

U.S. PATENT DOCUMENTS

| | | |
|---|---|---|
| 2017/0180116 A1 | 6/2017 | Yap et al. |
| 2019/0043600 A1* | 2/2019 | Saileshwar ......... G06F 11/1048 |
| 2019/0058675 A1* | 2/2019 | Schubert ................ H04L 47/34 |
| 2019/0220721 A1* | 7/2019 | Chhabra ............ G06K 19/0724 |
| 2020/0296099 A1* | 9/2020 | Shanbhogue ......... H04L 9/0637 |
| 2021/0058237 A1* | 2/2021 | Sandberg ............... G06F 21/85 |

* cited by examiner

OVERHEAD REDUCTION FOR LINK PROTECTION

CROSS-REFERENCE TO RELATED APPLICATIONS

The present application claims priority to U.S. Provisional Patent Application No. 62/873,635, filed Jul. 12, 2019 and titled "OVERHEAD REDUCTION FOR LINK PROTECTION," the entire disclosure of which is hereby incorporated by reference.

FIELD

Various embodiments generally may relate to the field of communication and computing, and in particular, may relate to security and protection of communication between computing devices or between components of a computing device.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A computer system, or a platform, may include many components, such as a host including a central processing unit (CPU), memory, chipsets, and/or many other devices coupled together by a computer bus. A computer bus is a communication system that may facilitate transfer of data between devices or components inside a computer, or between computers. A computing system or a platform may use various devices coupled to a computer bus extensively. A computer bus may include related hardware components (wire, optical fiber, etc.) and software, including communication protocols. There may be many kinds of computer bus, such as serial buses or parallel buses. An example serial bus is the high speed Peripheral Component Interconnect Express (PCIe) bus.

Emerging hardware processors are expected to have the capabilities of removing the hypervisor from the trusted computing base (TCB) of the virtual machines (VM) the hypervisor manages. An example use case is a Cloud Service Provider (e.g., Microsoft Azure) that hosts many tenant VM workloads. From the perspective of both, the Cloud Service Provider (CSP) and the Cloud Tenant, both parties desire confidentiality for the VM workload. To achieve this confidential VM execution, the memory and the runtime CPU state must be kept confidential and integrity-protected to prevent data exfiltration or tamper attacks. Intel has proposed a new central processing unit (CPU) security capability called Trust Domain Extensions (TDX) to meet these security objectives via the use of memory encryption and integrity via the Memory Controller engines (MK-TME).

Trust Domain Extensions (TDX) extends Intel's Virtual Machines Extensions (VMX) with a new kind of virtual machine guest called Trust Domain (TD). A TD runs in a CPU mode which protects the confidentiality of its memory contents and its CPU state from any other software, including the hosting Virtual Machine Monitor (VMM), unless explicitly shared by the TD itself. To enable direct assignment of PCIe devices to TD memory, the data flowing between the TDs and the device over the PCIe links need to be secured to enforce confidentiality, integrity, and replay protection of the data.

Conventional authenticated encryption (e.g., Advanced Encryption Standard-Galois/Counter Mode (AES-GCM)) may be used for link encryption as it provides confidentiality, integrity, and replay protection, meeting the security requirements for link encryption. However, conventional cryptographic mechanisms can introduce significant latency to the PCIe transactions, which can potentially limit the adoption of link protection as it can offset the benefits of acceleration significantly.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
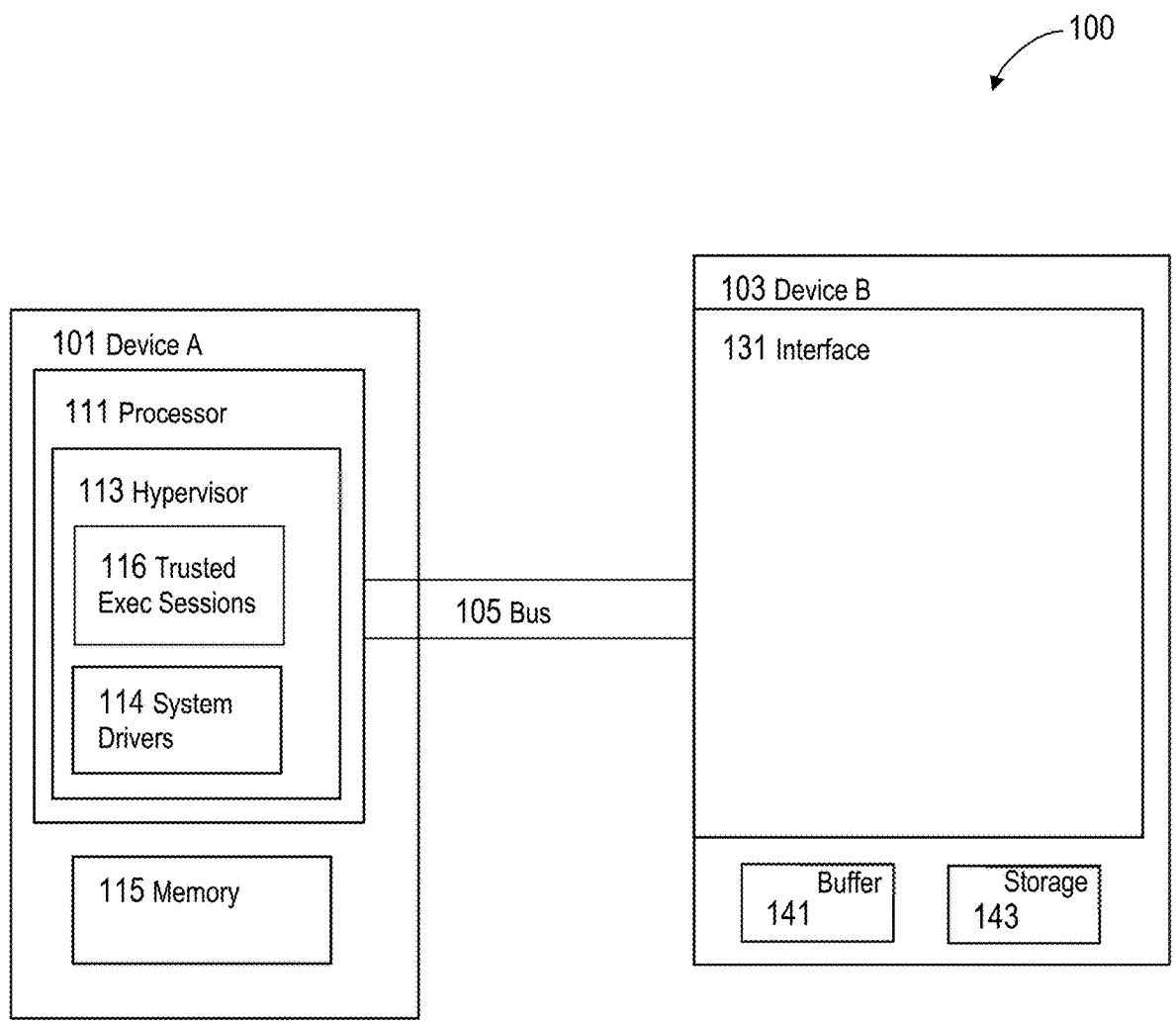
FIG. 1 illustrates an example apparatus including a device coupled to another device by a computer bus incorporated with the link protection technology of the present disclosure, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

A computing system or a platform may use various devices coupled to a computer bus extensively. A computer bus may include related hardware components (wire, optical fiber, etc.) and software, including communication protocols. A peripheral component interconnect (PCI) bus or a PCI Express (PCIe, PCI-E) may be a computer bus based on a specification that provides a mechanism for system software, or a system driver, to perform various operations related to the configuration of a device coupled to the PCI bus or the PCIe bus. Devices, or components coupled to a computer bus may also be referred to as functions. PCIe may operate in consumer, server, and industrial applications, as a motherboard-level interconnect (to link motherboard-mounted peripherals), a passive backplane interconnect, and as an expansion card interface for add-in boards. PCIe devices communicate via a logical connection called an interconnect or link. A link is a point-to-point communication channel between two PCIe ports allowing both of them to send and receive ordinary PCI requests, e.g., configuration, input/output (I/O), or memory read/write, and interrupts. At the physical level, a link may be composed of one or more lanes. Low-speed peripherals, such as an 802.11 Wi-Fi card, use a single-lane (×1) link, while a graphics adapter typically uses a much wider and faster 16-lane link. In the description below, a PCI bus or a PCIe bus may be used as an example of a computer bus. Similarly, a PCI device or a PCIe device may be used as an example of a device coupled to a computer bus. Descriptions about a PCIe device may be applicable to any other device coupled to any computer bus. For example, a PCI request, which may be simply referred to as a request, may be an example of a communication request for a link of a computer bus.

Embodiments herein present mechanisms to reduce or eliminate cryptographic waste as a foundation approach to ensure reduced or no latency addition for encryption/decryption in the presence of variable sized requests sent or received over one or more communication links of a computer bus of a computer system, e.g., a computer system hosting multiple trusted execution sessions. The variable sized requests may be of different request types. The computer system may be a computer system where a hypervisor is removed from the TCB of the VMs managed by the hypervisor, allowing the security accorded to the trusted execution sessions to be extended to include communication with entities external to the trusted execution sessions. Embodiments herein also present a crypto architecture and design to generate cryptographic pads in a way such that each of the cryptographic pad is used for encryption/decryption and/or message authentication code (MAC) generation for Advanced Encryption Standard (AES) Galois/Counter Mode (GCM) encryption/decryption, where unlike prior art AES-GCM schemes, pre-generated cryptographic pads may be wasted in the presence of variable sized requests. GCM is a mode of operation for symmetric-key cryptographic block ciphers, where the operation is based on an authenticated encryption algorithm designed to provide both data authenticity (integrity) and confidentiality. As an example, GCM may be defined for block ciphers with a block size of 128 bits. In cryptography, a MAC, sometimes known as a tag, is a short piece of information used to authenticate a message, in other words, to confirm that the message came from the stated sender (its authenticity) and has not been changed.

Embodiments herein may perform the link protection without requiring the bandwidth overheads of some other existing mechanisms. For example, embodiments herein present two mechanisms to achieve its latency and bandwidth goals. Some embodiments herein may use monotonic counter, e.g., as initialization vector (IV), for encryption and MAC generation and describe pad pre-generation and scheduling architecture to ensure availability of pads for all sized requests at reduced or zero latency costs. Some other embodiments may present cryptographic splitting, a technique to split an original packet to smaller packet chunks that are treated independently for cryptography purposes alone and then accumulates MACs on individual cryptographic packet chunks to send over the link. This technique again allows for reduced or zero latency encryption/decryption with minimal bandwidth overheads, e.g., 12B MAC for each transaction layer packet (TLP) in the case of PCI communication. For description below, reduced latency or zero latency may be used interchangeably, unless explicitly specified otherwise. A reduced latency is stated in comparison with other existing mechanisms.

Various operations will be described as multiple discrete operations, in turn, in a manner that is most helpful in understanding the illustrative embodiments; however, the order of description should not be construed as to imply that these operations are necessarily order dependent. In particular, these operations may not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like). As used herein, the terms "instantiate," "instantiation," and the like may refer to the creation of an instance, and an "instance" may refer to a concrete occurrence of an object, which may occur, for example, during execution of program code.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

As used herein, the term "user equipment" or "UE" may refer to a device, such as a computer device, with radio communication capabilities and may describe a remote user of network resources in a communications network. The term "user equipment" or "UE" may be considered synonymous to, and may hereafter be occasionally referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc.

Examples of "computer devices", "computer systems", "UEs", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. The term "RSU" may refer to any transportation infrastructure entity implemented in an gNB/eNB or a stationary (or relatively stationary) UE. An RSU implemented in a UE may be referred to as a "UE-type RSU" and an RSU implemented in an eNB may be referred to as an "eNB-type RSU." As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

Referring now FIG. 1, wherein an overview of an example apparatus including a device coupled to another device by a computer bus incorporated with the link protection technology of the present disclosure, in accordance with various embodiments, is illustrated, As shown, for the illustrated embodiments, example apparatus 100 includes a device 101, e.g., a host, coupled to another device 103 by a computer bus 105, incorporated with the link protection technology of the present disclosure. For clarity, features of the apparatus 100, the device 101, the device 103, and the computer bus 105, are described below as an example. It is to be understood that there may be more or fewer components included in the apparatus 100, the device 101, the device 103, and the computer bus 105. For example, device 101 or device 103 may include one or more hardware accelerators (not shown), Further, it is to be understood that one or more of the devices and components within the apparatus 100 may include additional and/or varying features from the description below, and may include any device that one having ordinary skill in the art would consider and/or refer to as a host, a device, and a computer bus.

In embodiments, the device 101 may include the processor 111 and a memory 115. A hypervisor 113 may operate on the processor 111, and may include one or more system drivers 114. Hypervisor 113 is arranged to host/manage execution of a number trusted execution sessions 116. Examples of trusted execution sessions 116 include VMs. In various embodiments, processor 111 includes features that exclude hypervisor 113 from the TCB of the trusted execution sessions.

The device 103 may be coupled to the device 101 by way of the computer bus 105. The device 103 may include an interface 131 coupled to the computer bus 105, a buffer 141, and a storage 143. The interface 131 may include one or more registers, such as a capability header register, an authentication header register, an authentication capability register, an authentication status register, an authentication control register, a write data mailbox register, a read data mailbox register, or some other registers. An example of the computer bus 105 may be a PCI bus. Accordingly, the data packets/requests sent by the trusted execution sessions 116 over links established over the computer bus 105 include data packets/requests of various request types. In various embodiments, interface 131 and its counterpart on device 101 of computer bus 105 are incorporated with the link protection technology of the present disclosure that provides for reduced or zero additional latency, making it practical to deploy link protection for the external communications by the trusted execution sessions, to be described more fully below.

In embodiments, the apparatus 100 may be any mobile computing system or platform, for example, a laptop computer, an ultra-laptop computer, a tablet, a touch pad, a portable computer, a handheld computer, a wearable device, a palmtop computer, a personal digital assistant (PDA), an e-reader, a cellular telephone, a combination cellular telephone/PDA, a mobile smart device (e.g., a smart phone, a smart tablet, etc.), a mobile interne device (MID), a mobile messaging device, a mobile data communication device, a mobile media playing device, a camera, a mobile gaming console, etc. In embodiments, the apparatus 100 may also be a non-mobile device that may include, but is not to be limited to, for example, a server, a personal computer (PC), a television, a smart television, a data communication device, a media playing device, a gaming console, a gateway, an Internet of Things (JOT) device, etc.

The trusted execution sessions 116 may execute local programs or consume services provided by external service providers over a network. For example, the trusted execution sessions 116 may include one or more software clients or applications that run locally and/or utilize or access web-based services (e.g., online stores or services, social networking services, etc.). The trusted execution sessions 116 may also, or instead, include a web interface running in a browser from which the electronic apparatus can access such web-based services.

In addition to memory 115, the apparatus 100 may also include storage devices (not shown) to store logic and data associated with the programs and services used by the apparatus 100.

In embodiments, the processor 111 may be a central processing unit (CPU). In some embodiments, the processor 111 may be a programmable device that may execute a program, e.g., the system drivers 114 and/or programs of the trusted execution sessions 116. In embodiments, the processor 111 may be a microcontroller, a 16-bit processor, a 32-bit processor, a 64-bit processor, a single core processor, a multi-core processor, a digital signal processor, an embedded processor, or any other processor. In various embodiments, as noted earlier, the processor 111 includes features that exclude a hypervisor of operating system 113 from the TCB of the VMs it hosts/manages.

In embodiments, the operating system 113 may be any system software that manages hardware or software resources for the apparatus 100, and may provide services to applications, e.g., the system drivers 114, or applications within the trusted execution sessions 116. The operating system 113 may be Windows®, Android OS, iOS, Linux, a real-time operating system (RTOS), an automotive infotainment operating system, among others. For example, the operating system 113 may be a real-time operating system such as VxWorks, PikeOS, eCos, QNX, MontaVista Linux, RTLinux, Windows CE, or other operating system.

In embodiments, the computer bus 105 may be an external computer bus, an internal computer bus, a serial computer bus, or a parallel computer bus. For example, the computer bus 105 may be a PCI bus, a PCI Extended bus (PCI-X), a PCI express bus, a universal serial bus (USB), a parallel advanced technology attachment (PATA) bus, a serial ATA (SATA) bus, an inter-integrated circuit ($I^2C$) bus, an IEEE 1394 interface (FireWire) bus, a small computer system interface (SCSI) bus, a scalable coherent interface (SCI) bus, or other computer bus.

In embodiments, the device 103 may be any piece of computer hardware. For example, the device 103 may be a network interface card, an audio card, a video controller, an Ethernet controller, a webcam, mouse, a Bluetooth controller, a PCI to ISA bridge, a GUI Accelerator, an ATM Controller, a multimedia card, a SCSI controller, a multimedia device, a MPEG-II Video Decoder, or any input/output device. In embodiments, the device 103 may be a PCI device, which may be plugged directly into a PCI slot on a computer's motherboard. In some other embodiments, the device 103 may be coupled to the processor 111 by a different computer bus.

As alluded to earlier, the central processing units (CPUs) of processor 111 include the capabilities to remove hypervisor 113 from the trusted computing base (TCB) for virtual machines (VMs) it manages. Example user cases may include the earlier described example of a Cloud Service Provider (e.g. Microsoft Azure) that hosts many tenant VM workloads. From the perspective of both, the Cloud Service Provider (CSP) and the Cloud Tenant, both parties desire confidentiality for the VM workload. To achieve this confidential VM execution, the memory and the runtime CPU state may be kept confidential and integrity-protected to prevent data exfiltration or tamper attacks. In some embodiments, the CPU security capability may be the Trust Domain Extensions (TDX) available from Intel Corporation of Santa Clara, the capability may be used to meet these security objectives via the use of memory encryption and integrity via the Memory Controller's Multi-Key Total Memory Encryption (MK-TME) engines.

In embodiments, a Trust Domain Extensions (TDX) may be used to extend Virtual Machines Extensions (VMX) to provide a new kind of virtual machine guest, i.e., trusted execution domain 116, which may also be called Trust Domain (TD). A TD runs in a CPU mode that protects the confidentiality of its memory contents and its CPU state from any other software, including the hosting hypervisor (also referred to as Virtual Machine Monitor (VMM)), unless explicitly shared by the TD itself. To enable direct assignment of computer bus agents, such as PCIe devices, to TD memory, the data flowing between the TDs and the device over the PCIe link needs to be secured to enforce confidentiality, integrity, and replay protection of the data.

Authenticated encryption (e.g., AES-GCM) may be used for link encryption as it provides confidentiality, integrity, and replay protection meeting the security requirements for link encryption. However, traditional cryptographic mechanisms can introduce significant latency to the (PCIe) bus transactions that can potentially limit the adoption of link protection as it can offset the benefits of acceleration significantly.

In embodiments, as will be described in more detail below, monotonic counters are used as IVs instead, for AES-GCM encryption, to reduce or contribute to reducing the latency of link encryption. In addition, cryptographic splitting are also used to meet the security requirements while significantly reducing the latency due to cryptographic operations for link protection, by eliminating cryptographic waste. For some embodiments, the crypto latency can be reduced by as much as 4.5× along with a ~20% bandwidth reduction, making link protection practical for use. Embodiments herein may be useful for the success operations of TDX as it allows accelerators to be included as part of secure computation at minimal costs.

In using authenticated encryption such as AES-GCM to encrypt and integrity protect secrets over a link, AES-GCM requires a unique counter to be encrypted to encrypt/decrypt data, and data is encrypted/decrypted by XORing the plaintext/ciphertext with the encrypted counter.

In case of memory encryption, for a read request, the cryptographic engine can hide the latency to generate the encrypted counter (or cryptographic pad or keystream) under the memory roundtrip latency and when the data is received from memory, it can be decrypted by XORing it with the pad that was generated in parallel to the read miss to memory. However, for a memory write request, since the request needs to be encrypted before being sent to memory, the latency to generate the cryptographic pad is added to the write request.

When prior art AES-GCM is used with link encryption, it de-generates to the write case discussed above. Each request received by the link encryption engines needs to wait for generation of the cryptographic pad (followed by MAC verification) before it can be sent forward (e.g., to memory to serve a read request from a device). Existing solutions may use fixed length data packets to allow pre-generation of pads and zero latency encryption operations.

In addition, existing solutions are very limited and introduce additional bandwidth overheads that can offset the benefits of acceleration. More specifically, the use of fixed length packets as crypto boundaries forces a MAC to be generated with each packet. As PCIe supports variable length packets (e.g., transaction layer packets or TLPs), existing solutions might require the packet size to be set small enough to cover the smallest size request. In an example scenario, assume that the MAC is generated every 64B and the maximum packets can be 1024B in size. For a maximum sized packet, the previously proposed schemes would require 16 MACs to be sent. With a 96b MAC (required by GCM standard), this translates to ~20% bandwidth overheads. In various embodiments, the link encryption technology of the present disclosure includes a composite or accumulated MAC approach to further reduce or eliminate latency, to be describe more fully below.

Having now provided an overview description of apparatus 100, the link protection technology of the present disclosure, with reduced or virtually no latency, provided to computer bus 105, to complement the security protection accorded to the trusted execution sessions 116 by processor 111, will now be described with references to the remaining Figures. For ease of understanding, parts of the description will be provided in the context of the computer bus 105 being a PCI bus, with TLP of different request types transmitted over the links. However, the disclosure is not so limited, and may be practiced with other computer buses, with or without the further granularity of request types.

Figure 2:
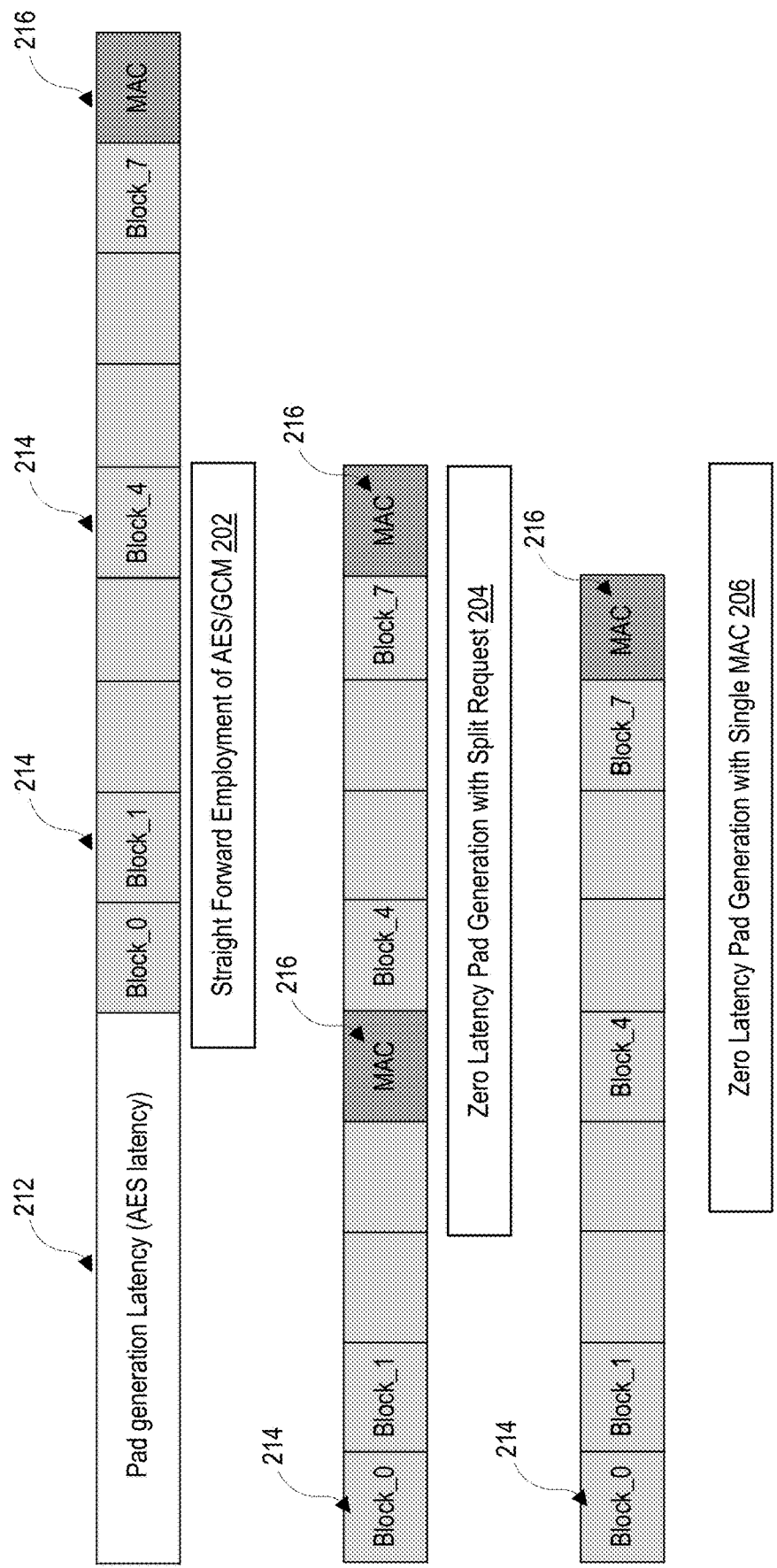
FIGS. 2-3 illustrate the accumulated or composite message authentication code (MAC) aspect of the link protection technology, in accordance with various embodiments.
Figure 3:
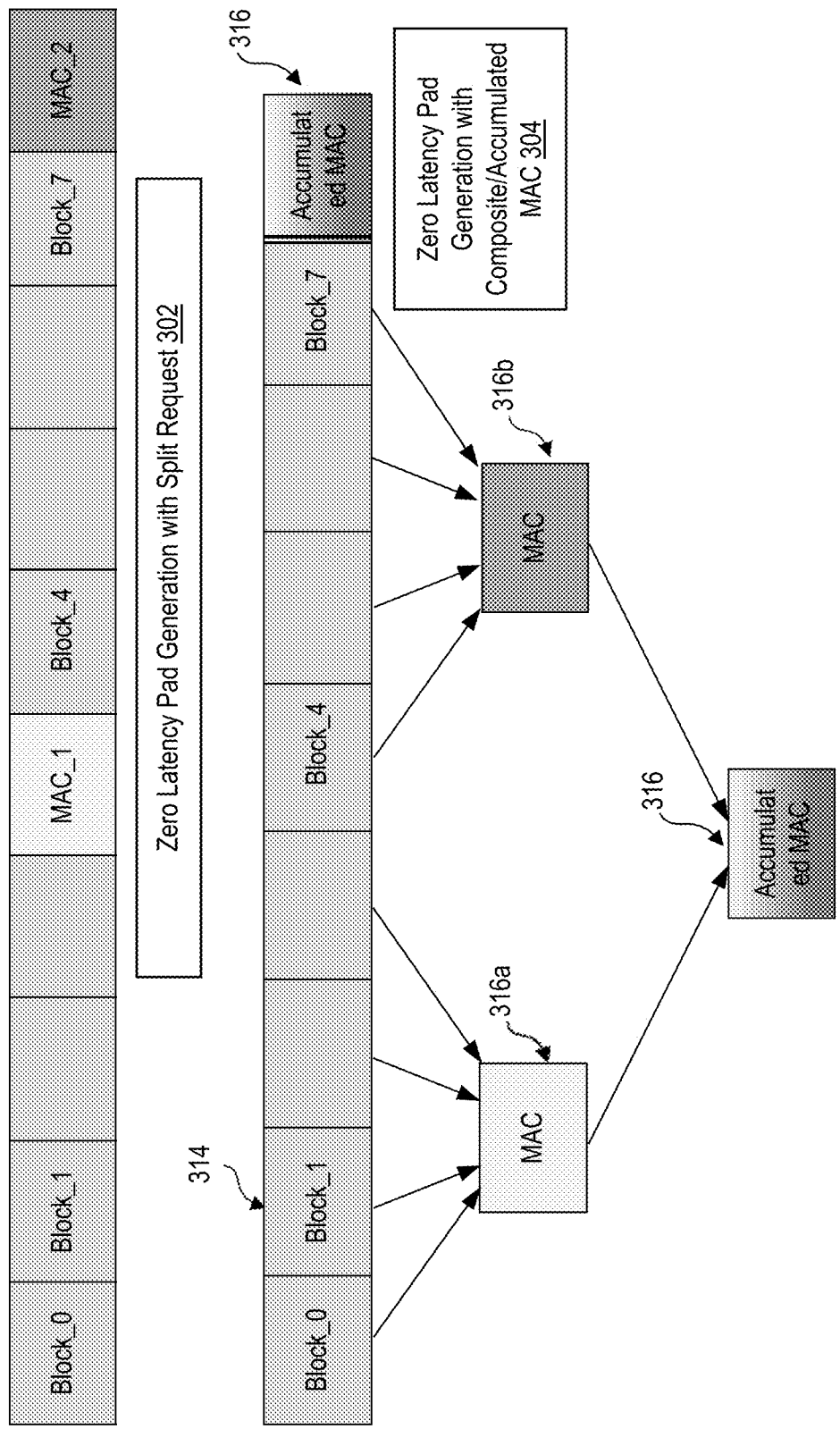

The employment of composite/accumulated MAC for employment of authenticated AES/GCM encryption to contribute to providing reduced or no latency link encryption will first be described. Referring now to FIGS. 2-3, wherein the composite/accumulated MAC aspect of the link protection technology of the present disclosure, in accordance with various embodiments, is illustrated. Embodiments described herein enable reduced or zero latency encryption/decryption for link protection, thereby allowing trusted execution sessions to extract the most from e.g., acceleration capabilities of accelerators in a computer platform (external to the trusted execution sessions) in a secure way. The benefits shown in FIGS. 2-3 may be applicable to the devices coupled by the computer bus 105 shown in FIG. 1.

FIGS. 2-3 use a 128B request as an example request to illustrate the composite/accumulated MAC scheme of the present disclosure. Block 202 shows the straight forward employment of authenticated AES/GCM encryption to link encryption. In this scheme, the AES/GCM encryption engine waits to receive the transmission request, and generates the encryption pads needed on to encrypt the data blocks of the transmission request, thereby adding the encryption pad generation latency 212 to the transmission request processing. After the generation of the encryption pads, the data blocks of the transmission request are successively encrypted. For the illustrated example, eight block of 16B size are successively encrypted. On successive encryptions of the data blocks, the MAC is generated 216.

Block 204 illustrates an alternative approach, where the AES/GCM encryption engine encrypts data blocks 214 of fixed size chunk splits, e.g., 64B, from the transmission request. A MAC 216 is generated after the data blocks of every 64B chunk to allow the AES/GCM encryption engine to pre-compute the required encryption pads to not introduce additional latency. As can be seen, the two schemes will either have a latency or a bandwidth impact or both.

Block 206 illustrates another approach that avoids any latency addition due to the cryptographic processing and keep the additional bandwidth required to a minimum, by only adding a single MAC 216 at the end of each transmission request, e.g., at the end of each TLP in the case of PCI. Assuming a 14-cycle AES latency (latency for AES-256) and 4-cycle latency for MAC verification, the improved embodiments may reduce or completely hide the AES latency required to generate the encryption pads, requiring only the 4-cycle latency for MAC verification resulting in a latency reduction of as much as 4.5× making link protection practical for use. Thus, embodiments disclosed herein can be useful for the success of secure environment, e.g., TDX, or other trusted execution environments (TEEs), as it allows e.g., accelerators of the computing platform (external to the secure environments) to be included as part of secure computation at reduced or minimal costs.

FIG. 3 illustrates the embodiments of block 206 further through an example reduced latency encryption using MAC accumulation. Embodiments of block 302 correspond to the embodiments of 204, and are provided here in FIG. 3 for references. Embodiments of block 304 illustrate how the single MAC for each transmission request is achieved In this alternate approach, a transmission request/packet is broken into multiple smaller fixed sized chunks or groups of data blocks (for crypto purposes alone). As an example, 64B can be chosen as the granularity of GCM invocation. A transmission request/packet, e.g., TLP in the case of PCI, greater than 64B is broken down to the required 64B chunks, and each chunk is sent through AES-GCM to get encrypted and generate a MAC, 316a, 316b and so forth. However, the generated MACs 316a, 316b, and so forth, for the smaller chunks are not transmitted. Instead, the individual MACs 316a, 316b, and so forth are accumulated using a function, and the accumulated/composite MAC 316 is sent at the end of the transaction. On the receiver side, the receiver would mirror the encryption side, generate individual MACs on the 64B chunks, accumulate them using the same function, and then compare the locally generated accumulated/composite MAC with the received reference accumulated/composite MAC. As a result, there may be reduced or no wastage of cryptographic pads (as all pads get used up), but no additional bandwidth is consumed as compared with the straight forward approaches (with or without splitting of the transmission request/packet).

Figure 4:
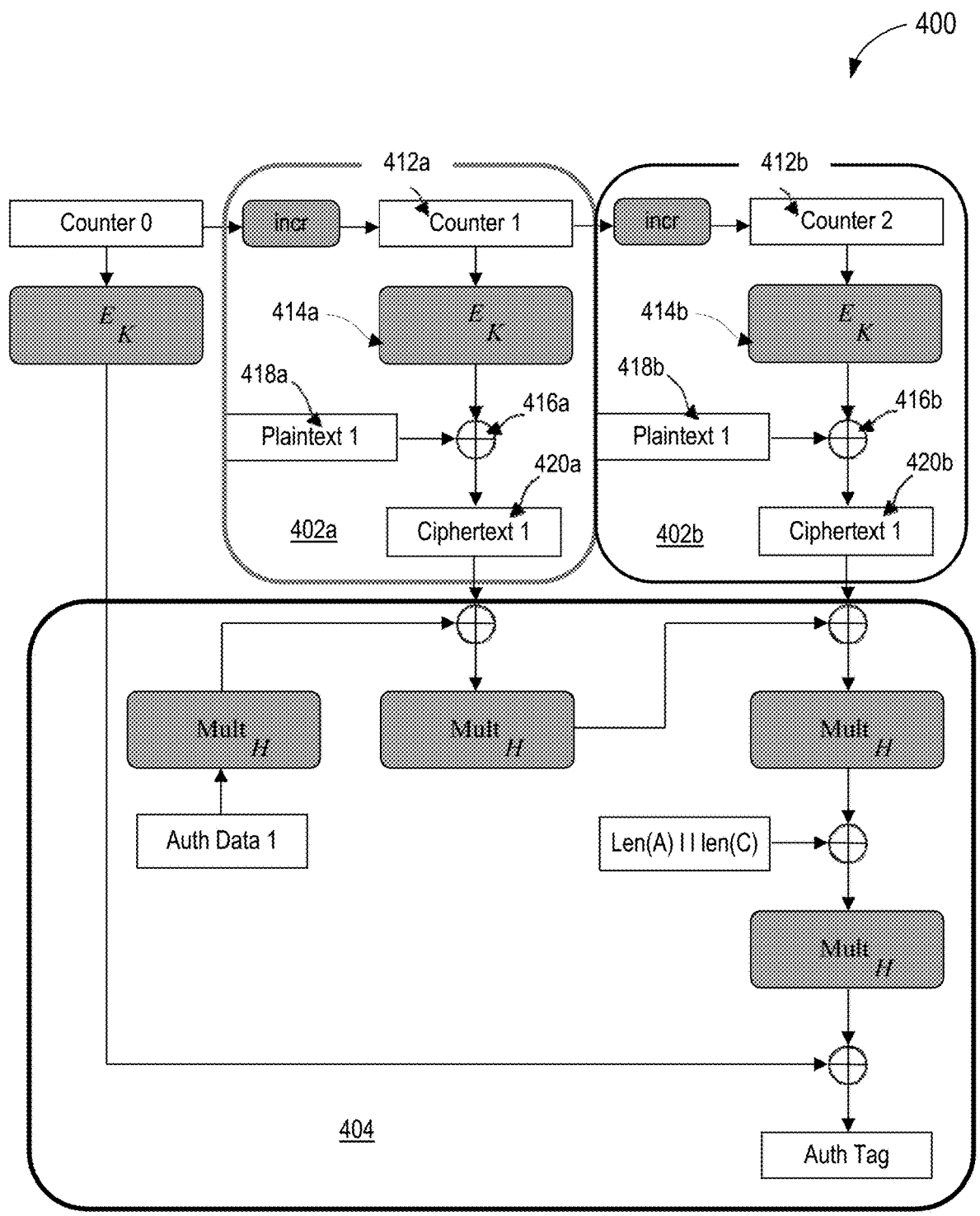
FIG. 4 illustrates an example AES-GCM encryption construction incorporated with improved pad generation of the link protection technology of the present disclosure, in accordance with various embodiments.

Referring now to FIG. 4, wherein an example AES-GCM construction incorporated with the improved pad generation of the link protection technology of the present disclosure, in accordance with various embodiments, is illustrated. As shown, for the illustrated embodiments, example AES-GCM construction 400 with the improved pad generation of the link encryption technology of the present disclosure, similar to conventional AES-GCM encryption, includes a number of encryption engines (circuitry) 402a and 402b, disposed on the transmitter side, and a MAC authentication engine (circuitry) 404, disposed at the receiver side. It is to be understood that the transmitter side also includes MAC generation circuitry (not shown) arranged to generate MACs as earlier described with references to FIGS. 2-3. It is also to be understood that the receiver side also includes decryption engines (not shown) that mirror the encryption engines 402a and 402b on the transmitter side.

Encryption engines 402a and 402b are arranged to encrypt corresponding data blocks of a data packet in parallel. In other embodiments, there may be more than two encryption engines, e.g., four, encrypting more than two data blocks of a data packet in parallel. In each encryption engine, e.g., 402a or 402b, encryption of a data block is performed using counter-mode encryption, where a counter 412a/412b associated with data is encrypted (pad) 414a or 414b and XORed 416a or 416b with data 418a/418b for encryption, decoupling cryptographic work from the data itself: C=P XOR PAD, where P is the plaintext 418a/418b and C is the ciphertext 420a/420b. In various embodiments, circuitry 414a/414b to generate the encryption pads are incorporated with the teaching of the present disclosure, using monotonically increased counter values as IV in generation of the encryption pads, to be described more fully below with references to FIGS. 5 and 6.

In various embodiments, the MAC generation circuitry on the transmitter side (mirroring the authentication engine 404 of the receiver side) generates an accumulated/composite MAC for each data packet, as earlier described with references to FIGS. 2-3. The transmit path of the transmitter side will be further described later with references to FIG. 9.

Decryption is based on P=C XOR PAD. Therefore, each of the corresponding plurality of decryption engines on the receiver side (mirroring the encryption engines 402a and 402b on the transmitter side) is similarly constituted with a counter, decryption circuitry to generate the decryption pad, and XOR circuitry to decyrpt a ciphertext by XOR the ciphertext with the decryption pad to recover the plaintext. Similarly, the decryption circuitry to generate the decryption pads are incorporated with the teaching of the present disclosure, using monotonically increased counter values as IV in generation of the decryption pads, to be described more fully below with references to FIGS. 5 and 6.

Authentication engine 404 is arranged to perform MAC authentication. Authentication engine 404 is arranged to perform GHASH operation. On receiving encrypted data 420a/420b, a receiver generates the MAC on each recovered data chunks, accumulates the MACs with a function, and compares the final accumulated/composite MAC with the MAC received with the data (also known as reference MAC). A mismatch between the locally generated MAC and the received MAC indicates integrity violation and a security exception may be generated to signal to end the secure session. The receive path of the receiver side will be further described later with references to FIG. 8.

Figure 5:
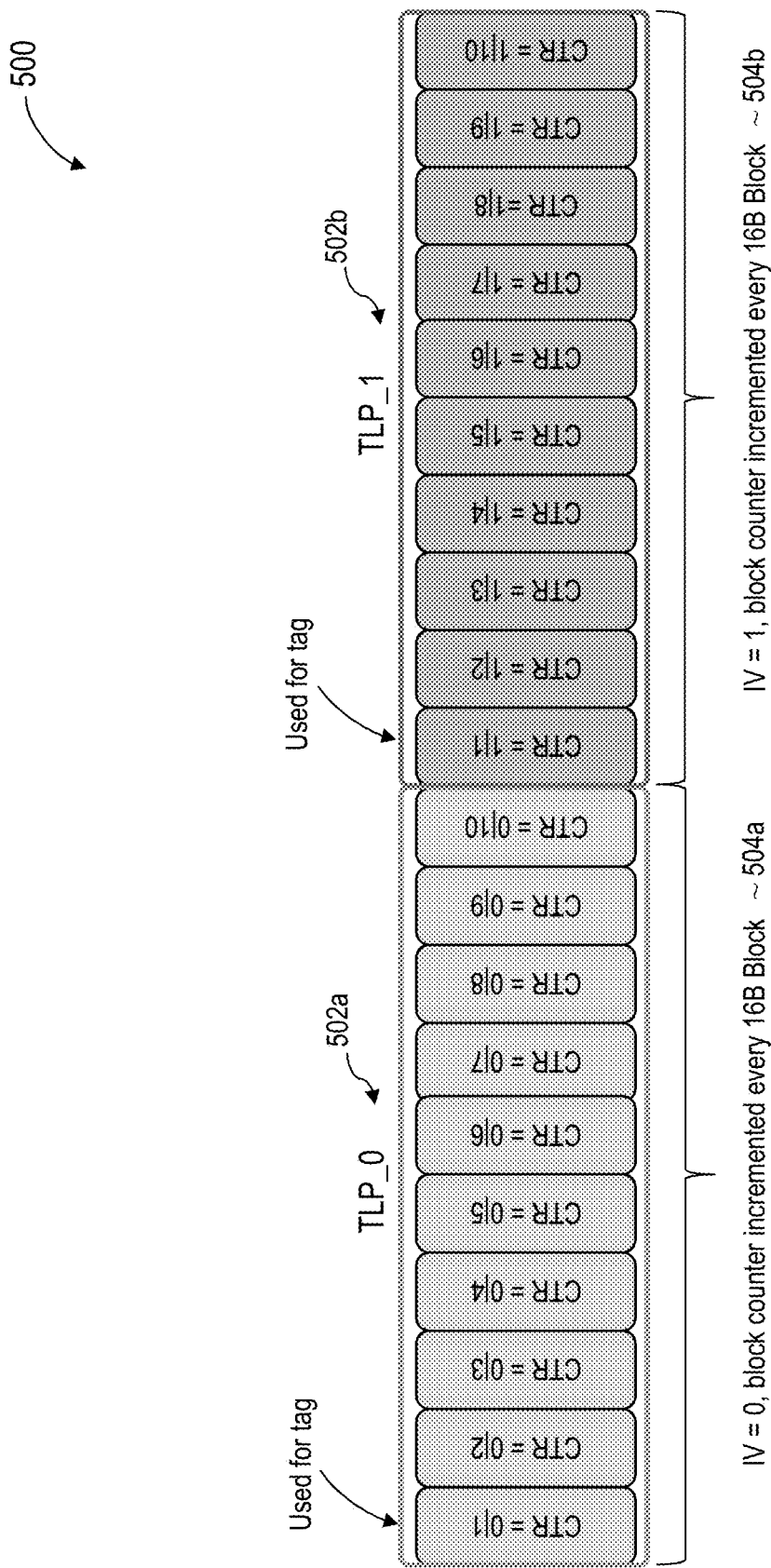
FIG. 5 illustrates prior art usage of initialization vector (IV) in AES-GCM encryption of PCIe transaction layer packets (TLP).

In traditional AES-GCM authentication encryption, the counter used is generated as follows as per the NIST standard specification (assuming len(IV)=96b):—Counter= IV Block_counter. For encryption/decryption, the data to be encrypted/decrypted is split in 16B (=AES block size) granular blocks and same IV 504a504b is used for individual blocks 502a/502b covered by the same MAC, e.g., TLP in the case of PCI, with the block counter incremented for each of the blocks to allow a unique counter value to be used for each block, a requirement for counter-mode encryption. The block counter starts with $0^{31}1$ and is incremented for each of the 16B blocks 502a/502b in the data to be encrypted/decrypted. Block_counter value of $0^{31}1$ is used for the pad for MAC generation as shown in FIG. 5.

In various embodiments, the parameters for the crypto operations may be as follows: (1) data path of 64B @1 GHz, (2) AES with 256b keys, (3) the crypto engines are located between the link layer and transaction layer and process, (4) 64B per cycle @ 1 GHz, with 4 parallel AES engines present on the 64B path to allow for processing at full bandwidth, (5) AES latency may be 1 cycle/round (AES-256 has 14 rounds, hence, 14 cycles needed for encryption). Accordingly, 14-cycles are required for pad generation for each of the 16B blocks can be completely hidden to enable a high performance solution.

In others embodiments, other particular cryptographic algorithms, key sizes, data path width, and frequency may be used, the example parameters enumerated above are for illustration purposes only.

In various embodiments, for maximum bandwidth, there may be a need to make sure enough pads are available to cover all request/completion combinations. The pads can be variable in size, e.g., 0-1024B. Since AES latency is assumed to be 14 cycles, there may be a need for enough pads to cover 14 cycles worth of data. Largest or smallest back-to-back requests offer enough cycles between requests to generate pads for the next request and keep the pipeline full. More generically, if all requests are of the same size, the crypto engines can keep the pipeline full. However, large requests can be interleaved with small requests and can cause pipeline bubbles. Some crypto logic may assume maximum request size for pad pre-generation process.

For example, there may be back-to-back 64B requests (including write data). On consumption of first pad from the pad buffer, pad pre-generation starts assuming the $15^{th}$ request to be the largest supported request. If the $15^{th}$ request is 64B, the $16^{th}$ request will not find the pads in the pad buffer and will have to take the latency hit. The wasted cryptographic work results in pipeline bubbles and hence the inefficiencies.

Embodiments herein present two mechanisms to avoid cryptographic waste to enable a reduced or zero latency encryption/decryption solution: using monotonic counters as IV to avoid cryptographic waste, or cryptographic splitting with accumulated MACs.

Figure 6:
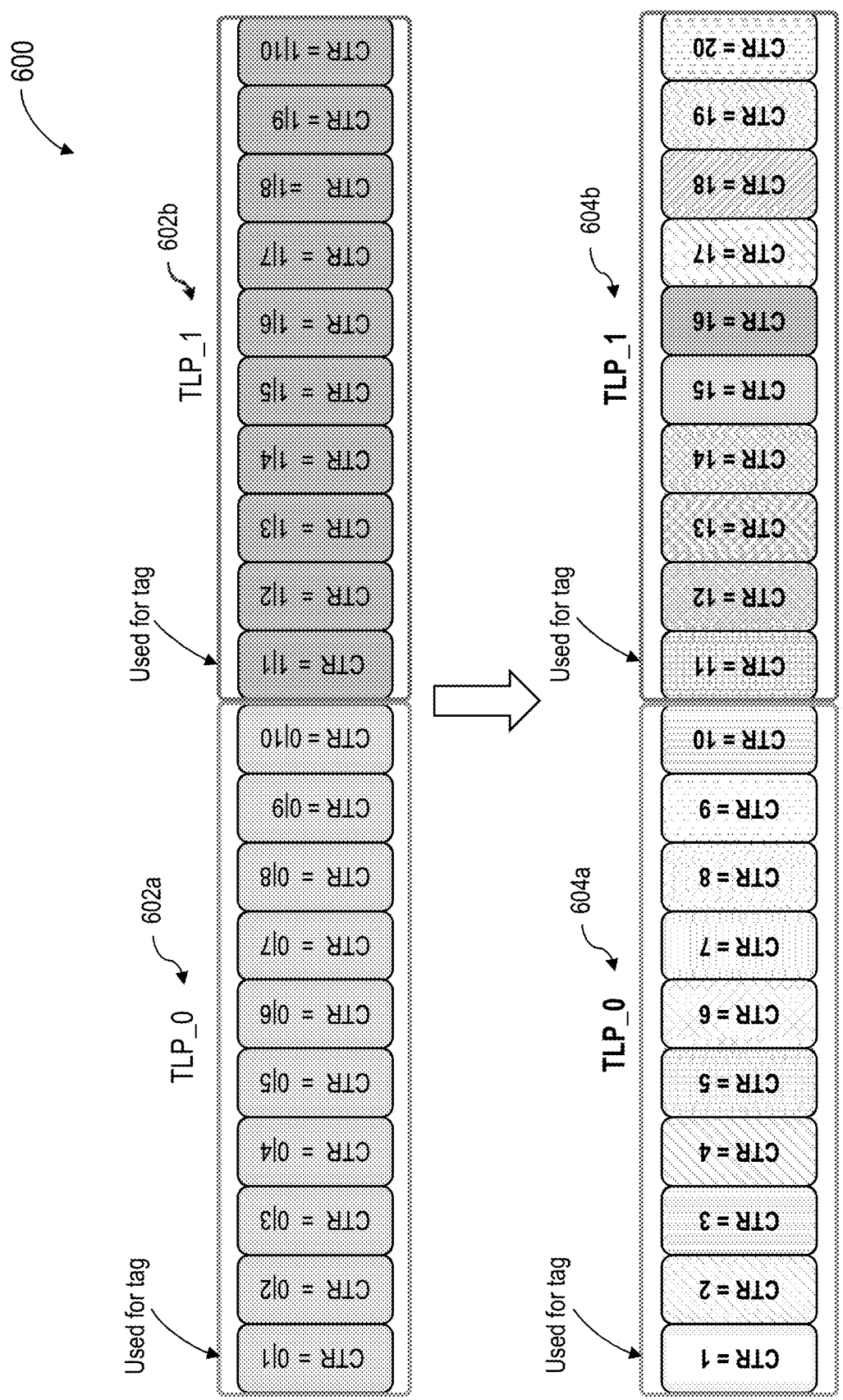
FIG. 6 illustrates the improved usage of monotonic counters as IVs in AES-GCM encryption of PCIe TLPs of the link protection technology of the present disclosure, in accordance with various embodiments.

Referring now to FIG. 6, wherein an example usage of monotonic counter as IV under the link encryption technology of the present disclosure with trusted execution session granularity, in accordance with various embodiments, is shown. Embodiments herein may use monotonic counters to avoid Cryptographic waste. Wasted cryptographic work with AES-GCM results in the inefficiencies. Embodiments herein present a scheme where no cryptographic work is wasted by using a monotonic counter as the IV. More specifically, counter-mode encryption requires the counter used for each block to be unique. GCM achieves this by using the IV|Block_counter concatenation but as shown above, it can result in pipeline bubbles with variable sized requests. With a monotonic counter, the counter for each 16B block is generated by sampling the monotonic counter and subsequently incrementing it. As shown in FIG. 6, no 16B block 604a and 604b will share any part of the counter that is used to encrypt/decrypt the block: 16B blocks 602a and 602b correspond to 16B blocks 502a and 502b of FIG. 5, and are included herein for reference/comparison purpose.

Hence, as shown in FIG. 6, with AES-GCM, under the present disclosure, as illustrated in the lower portion of the Figure, a single request/data packet, e.g., TLP in PCI, gets the same IV and a different block counter, each block irrespective of the request/data packet, it belongs is to get a different IV to be used for encryption.

Based on the IV construction, embodiments herein meet the requirements of counter-mode encryption to maintain counter uniqueness for each 16B block and does not waste cryptographic work. More specifically, embodiments herein may only pre-generate enough pads to cover the latency of AES engines. Assuming interface width of 64B, there may need to generate pad buffers deep enough to cover 14 cycles (AES latency) of data at 64B per cycle. The pads in the pad buffers are no longer tied to a particular request/data packet, e.g., TLP in the case of PCI, like conventional AES-GCM, and can be used for any request/data packet, e.g., TLP in the case of PCI, as and when it is received. Hence, in embodiments, no cryptographic work is wasted resulting in reduced or zero latency encryption/decryption for link encryption.

Figure 7:
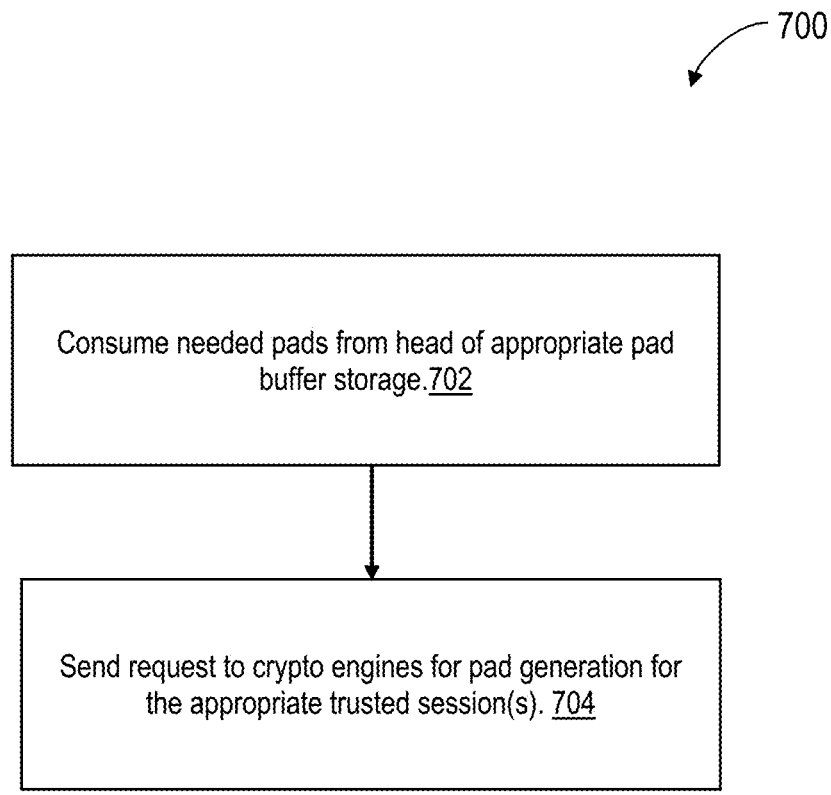
FIG. 7 illustrates an example process for pad generation of the link protection technology of the present disclosure, in accordance with various embodiments.

Referring now to FIG. 7, wherein an example process for pad generation and scheduling of the link protection technology of the present disclosure, in accordance with various embodiments, is illustrated. As shown, for the illustrated embodiments, process 700 for pad generation and scheduling includes operations performed at blocks 702 and 704. The operations may be performed by e.g., the encryption pad generation circuitry 414a or 414b of encryption engine 402 at the transmitter side of FIG. 4, or the mirrored counterpart decryption pad generation circuitry in the decryption engine at the receiver side.

At block 702, on receiving a request for encryption/decryption, the needed pads are consumed from the head of the appropriate pad buffer storage. In various PCI embodiments, in order to ensure reduced or zero latency addition, the crypto logic is arranged to schedule appropriate pads through the crypto engines. Implementations can chose to implement separate streams for different TLP types. In an example implementation, non-posted request (NPR) requests can be encrypted with one key and posted request (PR) and completion requests can be encrypted with another key and in yet another implementation, each of the three TLP types can have its own keys. On top of the request types, there can be multiple trusted sessions that are maintained over a link to allow multiple devices to communicate with potentially mutually distrusting TEEs. Hence, in various embodiments, the cryptographic engine are arranged to be able to handle multiple keys and multiple keystreams/pad buffers and schedule pad generation through the cryptographic engine depending on the trusted session and the request type that consumed the pads from the pad buffers in that cycle.

As an example, if a PR request for trusted session 0 has 64B of data that is received in a particular cycle, the crypto engines need to consume 4 pads from the head of the PR pad buffer for trusted session 0 and in the same cycle a request to generate the same number of pads consumed must be sent to the crypto engines for the same trusted session and same request type. Accordingly, the pre-generation and scheduling algorithm aims to keep the pad buffers for each request type and each trusted session full to cover the entire encryption latency. As a result, embodiments herein may allow zero latency encryption/decryption by having the pads always pre-generated and ready when needed.

In various embodiments, in order to maintain standard compliance, implementations can chose to use a separate key for MAC generation and encryption/decryption for each request type in each trusted session. In such implementations, each session and request type will need to maintain a separate pad buffer for MACs alone (i.e., separate counter and keying material will be maintained).

In various embodiments, from block 702, process 700 proceeds to block 704. At block 704, request is sent to crypto engines for pad generation for the appropriate trusted session(s). In various embodiments, e.g., PCI embodiments, the request is particularized for a request type, e.g., NPR, PR or completion.

Figure 8:
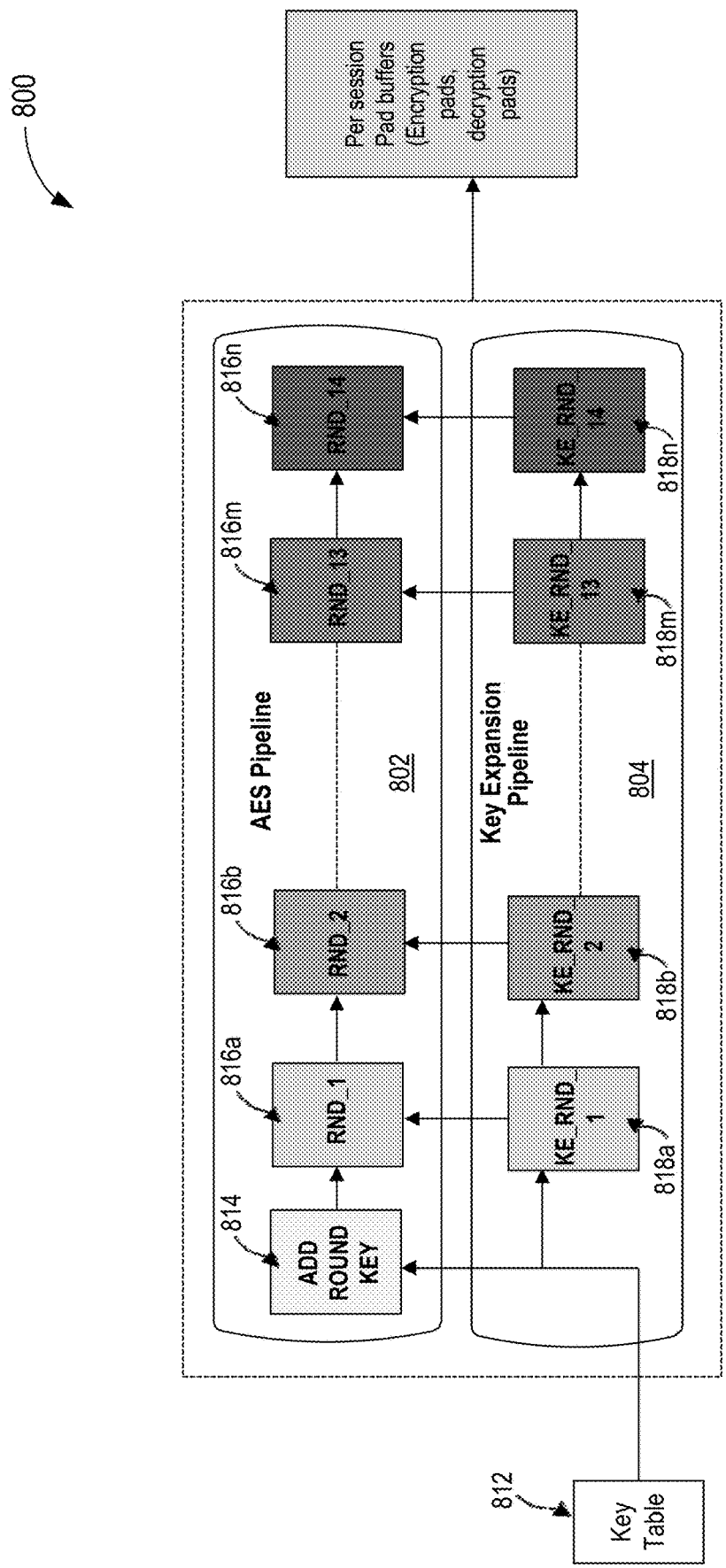
FIG. 8 illustrates an example multi-key crypto engine with on-the-fly key expansion of the link protection technology of the present disclosure, in accordance with various embodiments.

Referring now FIG. 8, wherein a pipeline view of an example multi-key crypto engine with on-the-fly key expansion, in accordance with various embodiments, is illustrated. As shown, for the illustrated embodiments, multi-key crypto engine 800 includes AES pipeline 802, key expansion pipeline 804, and key table 812, coupled with each other as shown. AES pipeline 802 includes add round key circuitry 814, and a plurality of AES encryption circuitry 816a, 816b and so forth, for a plurality of AES encryption rounds, serially coupled with each other. Add round key circuitry 814 is also coupled with key table 812. Key expansion pipeline 804 includes a plurality of key expansion circuitry 818a, 818b, and so forth, for the plurality of encryption rounds, serially coupled with other and with key table 812. The plurality of AES encryption circuitry 816a, 816b and so forth and the plurality of key expansion circuitry 818a, 818b, and so forth, are also corresponding coupled with each other.

Key table 812 is arranged to store a plurality of keys. In various embodiments, the plurality of keys are stored for a plurality of trusted execution sessions. In still other embodiments, the plurality of keys are for a plurality of request types of a plurality of trusted execution sessions. During operation, on receipt of a data packet/request, key table 812 outputs an appropriate one of the plurality keys from key table 812 (for (the request type of) the trusted execution session, if applicable) to the first key expansion circuitry for round 1 encryption 818a, and a control signal to add key circuitry 814. In response to receipt of the key, key expansion circuitry for round 1 encryption 818a expands the key and provide the round 1 expanded key to encryption circuitry for round 1 encryption 816a, and key expansion circuitry for round 2 encryption 816b to expand round one expanded key again for round 2 encryption.

After round 1 encryption, encryption circuitry for round 1 encryption 816a outputs the round 1 encryption result to encryption circuitry for round 2 encryption 816b, and key expansion circuitry for round 2 encryption 816b outputs expanded key for round 2 encryption to encryption circuitry for round 2 encryption 816b. Both pipelines continue until encryption circuitry for round 14 encryption 816n receives the round 13 encryption result from encryption circuitry for round 13 encryption 816m, and the encryption key for round 14 encryption from key expansion circuitry for round 14 encryption, 818n, and encrypt the data block for the 14$^{th}$ round.

Figure 9:
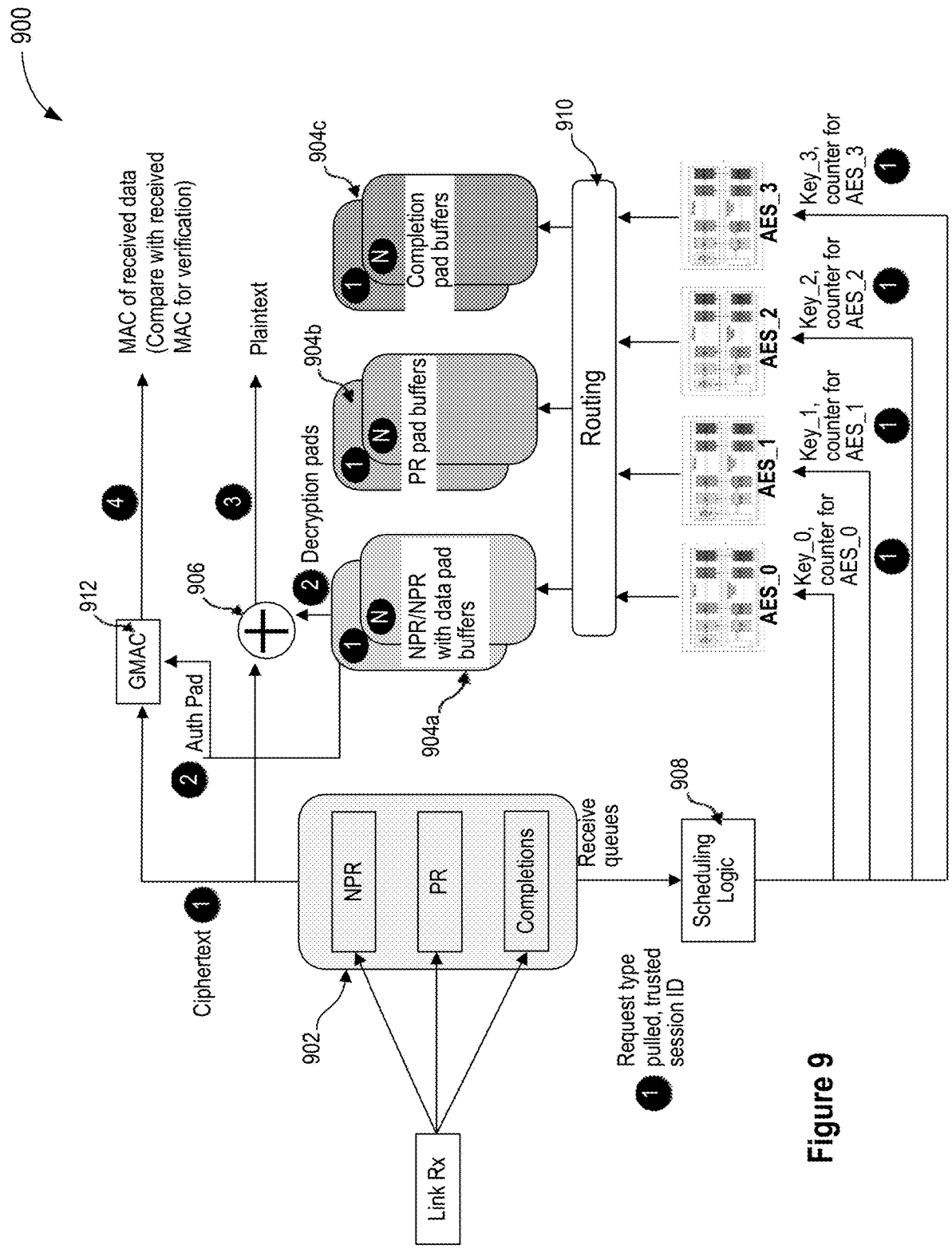
FIG. 9 illustrates an example receiving path in a receiver incorporated with the link protection technology of the present disclosure, in accordance with various embodiments.

Referring now to FIG. 9, wherein an example receiving path along with the placement of the crypto engines on the receiver side, in accordance with various embodiments, is illustrated. As shown, for the illustrated embodiment, example receiving path on the receiver side includes a plurality of receive queues 902, a plurality of buffers 904a-904c, decryption circuitry 906, scheduling logic 908, routing logic 910, and MAC authentication circuitry 912 coupled with each other.

Receive queues 902 are arranged to store encrypted/ciphertext data packets/requests (of a plurality of request types) of a plurality of trusted execution sessions of the host apparatus of the receiver, received over a link. In various embodiments, there are at least one receive queue 902 for each of a plurality of trusted execution sessions of the host apparatus. In other embodiments, there are at least one receive queue 902 for each of a plurality of request type of each of a plurality of trusted execution sessions of the host apparatus, e.g., a receive queue for NPR type data packets for each trusted execution session of the host apparatus, a receive queue for PR type data packets for each trusted execution session of the host apparatus, and a receive queue for completion type data packets for each trusted execution session of the host apparatus.

Buffers 904a-904c are arranged to store decryption pads (of a plurality of request types) of a plurality of trusted execution sessions. Similarly, in various embodiments, there are at least one buffer 904a-904c for each of a plurality of trusted execution sessions of the host apparatus. In other embodiments, there are at least one buffer 902a-902c for each of a plurality of request type of each of a plurality of trusted execution sessions of the host apparatus, e.g., a buffer for NPR type data packets for each trusted execution session of the host apparatus 904a, a buffer for PR type data packets for each trusted execution session of the host apparatus 904b, and a buffer for completion type data packets for each trusted execution session of the host apparatus 904c.

Decryption circuitry 906 is (are) arranged to decrypt data blocks of a data packet/request (of a request type) of a trusted execution session of the host apparatus. In various embodiments, decryption circuitry 906 comprises XOR circuitry to XOR an encrypted data block (ciphertext) with a decryption pad (for the request type) of the trusted execution session to recover the plaintext unencrypted data block.

Scheduling logic 908 and routing circuitry 910 are arranged to schedule and route the appropriate keys and counter values to buffers 904a-904c to pre-generate the decryption pads (for the various request types) of the trusted execution sessions. For the illustrated embodiments, it is assumed that there are four decryption engines (with decryption circuitry 906) to decrypt four data blocks (e.g., 16B) of a data packet/request (e.g., 64B) in parallel.

MAC authentication circuitry 910 is arranged to authenticate the received MAC associated with the data packet/request being decrypted. As described earlier, MAC authentication circuitry 910 is arranged to accumulate a MAC of each data chunk decrypted with a function, and compare the final accumulated/composite MAC with the received MAC, to facilitate reduction in latency in providing link encryption to trusted execution sessions.

Figure 10:
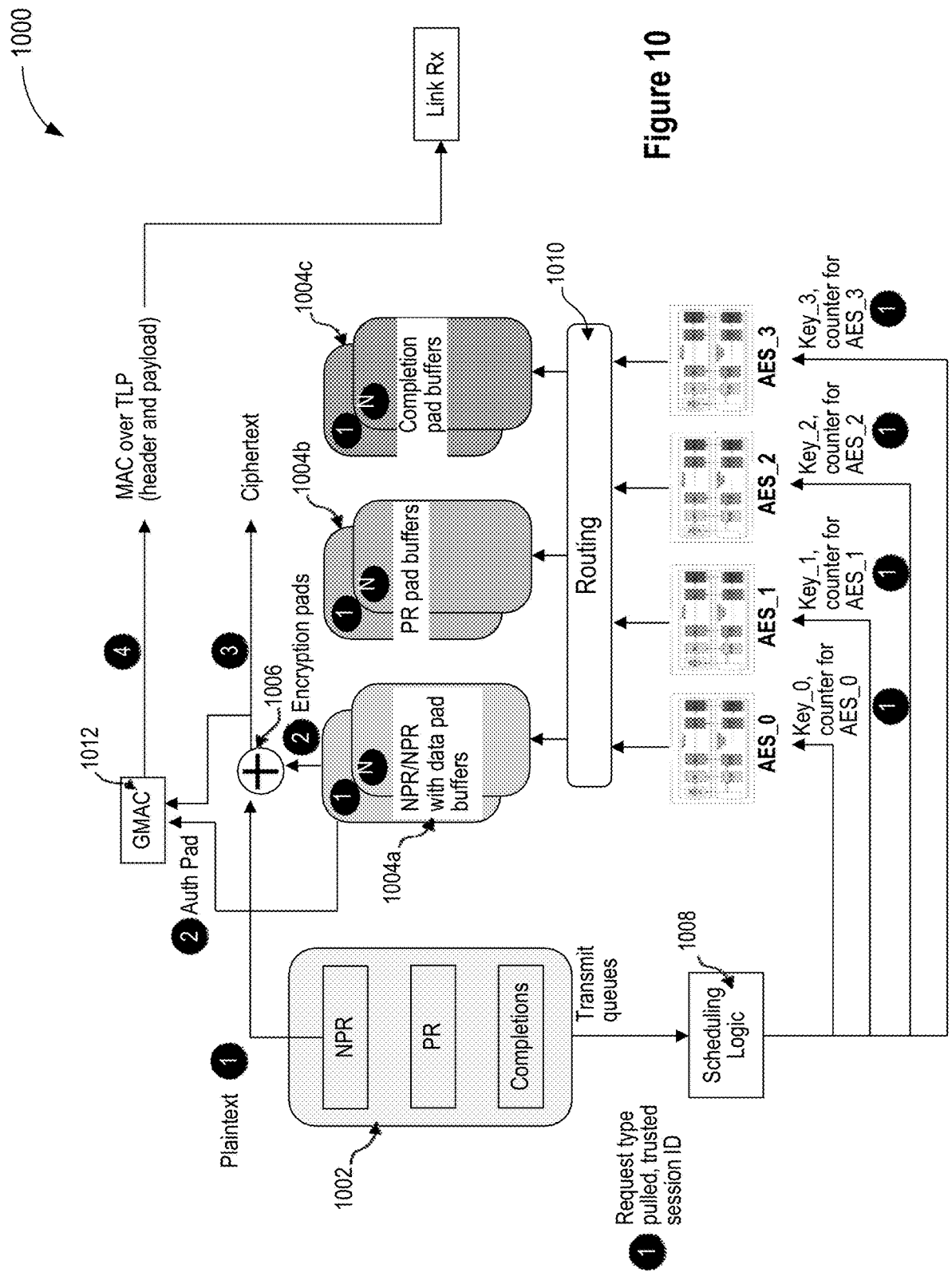
FIG. 10 illustrates an example transmit path in a transmitter incorporated with the link protection technology of the present disclosure, in accordance with various embodiments.

Referring now to FIG. 10, wherein an example transmitting path along with the placement of the crypto engines on the transmitter side, in accordance with various embodiments, is illustrated. As shown, for the illustrated embodiment, example transmit path on the transmitter side includes a plurality of transmit queues 1002, a plurality of buffers 1004a-1004c, encryption circuitry 1006, scheduling logic 1008, routing logic 1010, and MAC authentication circuitry 1012 coupled with each other.

Transmit queues 1002 are arranged to store unencrypted/plaintext data packets/requests (of a plurality of request types) of a plurality of trusted execution sessions to be transmitted over a link. In various embodiments, there are at least one transmit queue 1002 for each of a plurality of trusted execution sessions of the host apparatus. In other embodiments, there are at least one transmit queue 1002 for each of a plurality of request type of each of a plurality of trusted execution sessions of the host apparatus, e.g., a transmit queue for NPR type data packets for each trusted execution session of the host apparatus, a transmit queue for PR type data packets for each trusted execution session of the host apparatus, and a transmit queue for completion type data packets for each trusted execution session of the host apparatus.

Buffers 1004a-1004c are arranged to store encryption pads (of a plurality of request types) of a plurality of trusted execution sessions. Similarly, in various embodiments, there are at least one buffer 904a-904c for each of a plurality of trusted execution sessions of the host apparatus. In other embodiments, there are at least one buffer 1002a-1002c for each of a plurality of request type of each of a plurality of trusted execution sessions of the host apparatus, e.g., a buffer for NPR type data packets for each trusted execution session of the host apparatus 1004a, a buffer for PR type data packets for each trusted execution session of the host apparatus 1004b, and a buffer for completion type data packets for each trusted execution session of the host apparatus 1004c.

Encryption circuitry 1006 is (are) arranged to encrypt data blocks of a data packet/request (of a request type) of a trusted execution session of the host apparatus. In various embodiments, encryption circuitry 1006 comprises XOR circuitry to XOR an unencrypted data block (plaintext) with an encryption pad (for the request type) of the trusted execution session to generate encrypted/ciphertext data block.

Scheduling logic 1008 and routing circuitry 1010 are arranged to route the appropriate keys and counter values to buffers 1004a-1004c to pre-generate the decryption pads (for the various request types) of the trusted execution sessions. For the illustrated embodiments, it is assumed that there are four encryption engines (have encryption circuitry 1006) to encrypt four data blocks (e.g., 16B) of a data packet/request (e.g., 64B) in parallel.

Figure 11:
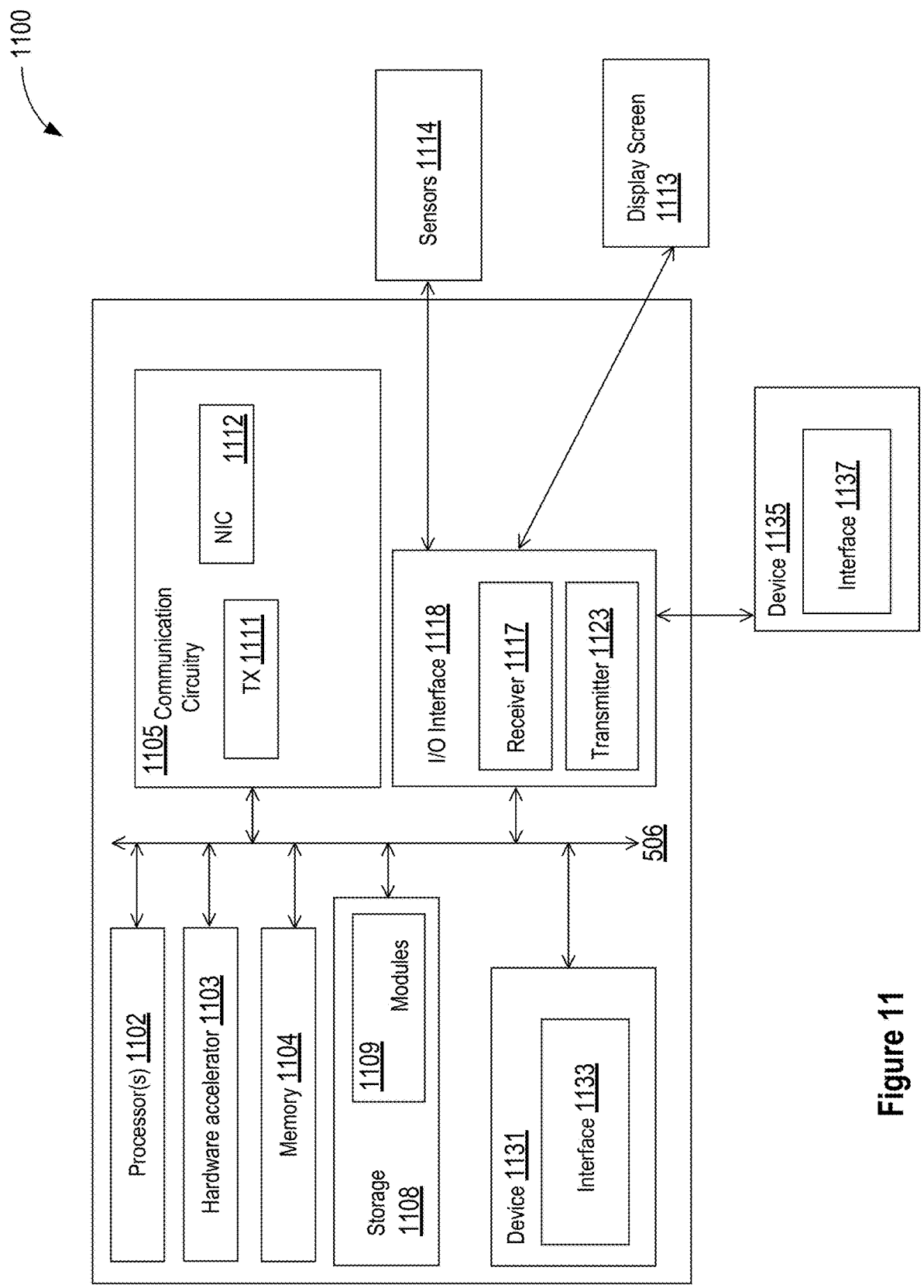
FIG. 11 illustrates an example computing device suitable for use to practice various aspects of the present disclosure, in accordance with various embodiments.

MAC authentication circuitry 1010 is arranged to generate a MAC to be associated with the data packet/request being encrypted and sent. As described earlier, MAC authentication circuitry 1010 is arranged to accumulate a MAC of each data chunk encrypted with a function, and transmit the final accumulated/composite MAC with the encrypted data blocks, to facilitate reduction in latency in providing link encryption to trusted execution sessions Referring now to FIG. 11, wherein an example device suitable for use to practice various aspects of the present disclosure, in accordance with various embodiments, is illustrated. The device 1100 may be used to implement functions of the apparatus 100. As shown, the device 1100 may include one or more processors 1102, each having one or more processor cores, or and optionally, a hardware accelerator 1103 (which may be an ASIC or a FPGA). In alternate embodiments, the hardware accelerator 1103 may be part of processor 1102, or integrated together on a SOC. Additionally, the device 1100 may include a memory 1104, which may be any one of a number of known persistent storage medium, and a data storage circuitry 1108 including modules 1109. In addition, the 1100 may include an I/O interface 1118, coupled to one or more sensors 1114, and a display screen 1113.

The I/O interface 1118 may include a transmitter 1123 and a receiver 1117 incorporated with the link protection technology of the present disclosure. Furthermore, the device 1100 may include communication circuitry 1105 including a transceiver (Tx) 1111, and network interface controller (NIC) 1112, incorporated with the link protection technology of the present disclosure. The elements may be coupled to each other via system bus 1106, which may represent one or more buses. In the case of multiple buses, they may be bridged by one or more bus bridges (not shown). A device 1131 may be coupled to the system bus 1106, and a device 1135 may be coupled to a computer bus 1139. The device 1131 may include an interface 1133, and the device 1135 may include an interface 1137. In embodiments, the computer bus 1106 or the computer bus 1139 may be an example of the computer bus 105 as shown in FIG. 1.

In embodiments, the processor(s) 1102 (also referred to as "processor circuitry 1102") may be one or more processing elements configured to perform basic arithmetical, logical, and input/output operations by carrying out instructions. Processor circuitry 1102 may be implemented as a stand-alone system/device/package or as part of an existing system/device/package. The processor circuitry 1102 may be one or more microprocessors, one or more single-core processors, one or more multi-core processors, one or more multithreaded processors, one or more GPUs, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor circuitry 1102 may be a part of a SoC in which the processor circuitry 1102 and other components discussed herein are formed into a single IC or a single package. As examples, the processor circuitry 1102 may include one or more Intel Pentium®, Core®, Xeon®, Atom®, or Core M® processor(s); Advanced Micro Devices (AMD) Accelerated Processing Units (APUs), Epyc®, or Ryzen® processors; Apple Inc. A series, S series, W series, etc. processor(s); Qualcomm Snapdragon® processor(s); Samsung Exynos® processor(s); and/or the like.

In embodiments, the processor circuitry 1102 may include a sensor hub, which may act as a coprocessor by processing data obtained from the one or more sensors 1114. The sensor hub may include circuitry configured to integrate data obtained from each of the one or more sensors 1114 by performing arithmetical, logical, and input/output operations. In embodiments, the sensor hub may capable of timestamping obtained sensor data, providing sensor data to the processor circuitry 1102 in response to a query for such data, buffering sensor data, continuously streaming sensor data to the processor circuitry 1102 including independent streams for each sensor of the one or more sensors 1114, reporting sensor data based upon predefined thresholds or conditions/triggers, and/or other like data processing functions.

In embodiments, the memory 1104 (also referred to as "memory circuitry 1104" or the like) may be circuitry configured to store data or logic for operating the computer device 1100. The memory circuitry 1104 may include number of memory devices may be used to provide for a given amount of system memory. As examples, the memory circuitry 1104 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, antifuses, etc.) that may be configured in any suitable implementation as are known. In various implementations, individual memory devices may be formed of any number of different package types, such as single die package (SDP), dual die package (DDP) or quad die package, dual inline memory modules (DIMMs) such as microDIMMs or Mini-DIMMs, and/or any other like memory devices. To provide for persistent storage of information such as data, applications, operating systems and so forth, the memory circuitry 1104 may include one or more mass-storage devices, such as a solid state disk drive (SSDD); flash memory cards, such as SD cards, microSD cards, xD picture cards, and the like, and USB flash drives; on-die memory or registers associated with the processor circuitry 1102 (for example, in low power implementations); a micro hard disk drive (HDD); three dimensional cross-point (3D)(POINT) memories from Intel® and Micron®, etc.

Where FPDs are used, the processor circuitry 1102 and memory circuitry 1104 (and/or data storage circuitry 1108) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor circuitry 1102 to implement various logic functions. The memory cells may include any combination of various levels of memory/storage including, but not limited to, EPROM, EEPROM, flash memory, SRAM, anti-fuses, etc.

In embodiments, the data storage circuitry 1108 (also referred to as "storage circuitry 1108" or the like), with shared or respective controllers, may provide for persistent storage of information such as modules 1109, operating systems, etc. The data storage circuitry 1108 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 1102; hard disk drives (HDDs); micro HDDs; resistance change memories; phase change memories; holographic memories; or chemical memories; among others. As shown, the data storage circuitry 1108 is included in the computer device 1100; however, in other embodiments, the data storage circuitry 1108 may be implemented as one or more devices separated from the other elements of computer device 1100.

In some embodiments, the data storage circuitry 1108 may include an operating system (OS) (not shown), which may be a general purpose operating system or an operating system specifically written for and tailored to the computer device 1100. The OS may include one or more drivers, libraries, and/or application programming interfaces (APIs), which provide program code and/or software components for modules 1109 and/or control system configurations to control and/or obtain/process data from the one or more sensors 1114.

The modules 1109 may be software modules/components used to perform various functions of the computer device 1100 and/or to carry out functions of the example embodiments discussed herein. In embodiments where the processor circuitry 1102 and memory circuitry 1104 includes hardware accelerators (e.g., FPGA cells, the hardware accelerator 1103) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)). For example, the modules 1109 may comprise logic for the corresponding entities discussed with regard to the display screen 1113, the transmitter 1123, and the receiver 1117.

The components of computer device 1100 may communicate with one another over the bus 1106. The bus 1106 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; Common Application Programming Interface (CAPI); point to point interfaces; a power bus; a proprietary bus, for example, Intel® Ultra Path Interface (UPI), Intel® Accelerator Link (IAL), or some other proprietary bus used in a SoC based interface; or any number of other technologies. In some embodiments, the bus 1106 may be a controller area network (CAN) bus system, a Time-Trigger Protocol (TTP) system, or a FlexRay system, which may allow various devices (e.g., the one or more sensors 1114, etc.) to communicate with one another using messages or frames.

The communications circuitry 1105 may include circuitry for communicating with a wireless network or wired network. For example, the communication circuitry 1105 may include transceiver (Tx) 1111 and network interface controller (NIC) 1112, both incorporated with the link protection teachings of the present disclosure. Communications circuitry 1105 may include one or more processors (e.g., baseband processors, modems, etc.) that are dedicated to a particular wireless communication protocol.

NIC 1112 may be included to provide a wired communication link to a network and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 1112 may be included to allow connect to a second network (not shown) or other devices, for example, a first NIC 1112 providing communications to the network over Ethernet, and a second NIC 1112 providing communications to other devices over another type of network, such as a personal area network (PAN) including a personal computer (PC) device. In some embodiments, the various components of the device 1100, such as the one or more sensors 1114, etc. may be connected to the processor(s) 1102 via the NIC 1112 as discussed above rather than via the I/O circuitry 1118 as discussed infra.

The Tx 1111 may include one or more radios to wirelessly communicate with a network and/or other devices. The Tx 1111 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of computer device 1100. In some embodiments, the various components of the device 1100, such as the one or more sensors 1114, etc. may be connected to the device 1100 via the Tx 1111 as discussed above rather than via the I/O circuitry 1118 as discussed infra. In one example, the one or more sensors 1114 may be coupled with device 1100 via a short range communication protocol.

The Tx 1111 may include one or multiple radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), and Fifth Generation (5G) New Radio (NR). It can be noted that radios compatible with any number of other fixed, mobile, or satellite communication technologies and standards may be selected. These may include, for example, any Cellular Wide Area radio communication technology, which may include e.g. a 5G communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated. Implementations, components, and details of the aforementioned protocols may be those known in the art and are omitted herein for the sake of brevity.

The input/output (I/O) interface 1118 may include circuitry, such as an external expansion bus (e.g., Universal Serial Bus (USB), FireWire, Thunderbolt, PCI/PCIe/PCIx, etc.), used to connect computer device 1100 with external components/devices, such as one or more sensors 1114, etc. I/O interface circuitry 1118 may include any suitable interface controllers and connectors to interconnect one or more of the processor circuitry 1102, memory circuitry 1104, data storage circuitry 1108, communication circuitry 1105, and the other components of computer device 1100. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, busses (e.g., bus 1106), ports, slots, jumpers, interconnect modules, receptacles, modular connectors, etc. The I/O circuitry 1118 may couple the device 1100 with the one or more sensors 1114, etc. via a wired connection, such as using USB, FireWire, Thunderbolt, RCA, a video graphics array (VGA), a digital visual interface (DVI) and/or mini-DVI, a high-definition multimedia interface (HDMI), an S-Video, and/or the like.

The one or more sensors 1114 may be any device configured to detect events or environmental changes, convert the detected events into electrical signals and/or digital data, and transmit/send the signals/data to the computer device 1100. Some of the one or more sensors 1114 may be sensors used for providing computer-generated sensory inputs. Some of the one or more sensors 1114 may be sensors used for motion and/or object detection. Examples of such one or more sensors 1114 may include, inter alia, charged-coupled devices (CCD), Complementary metal-oxide-semiconductor (CMOS) active pixel sensors (APS), lens-less image capture devices/cameras, thermographic (infrared) cameras, Light Imaging Detection And Ranging (LIDAR) systems, and/or the like. In some implementations, the one or more sensors 1114 may include a lens-less image capture mechanism comprising an array of aperture elements, wherein light passing through the array of aperture elements define the pixels of an image. In embodiments, the motion detection one or more sensors 1114 may be coupled with or associated with light generating devices, for example, one or more infrared projectors to project a grid of infrared light onto a scene, where an infrared camera may record reflected infrared light to compute depth information.

Some of the one or more sensors 1114 may be used for position and/or orientation detection, ambient/environmental condition detection, and the like. Examples of such one or more sensors 1114 may include, inter alia, microelectromechanical systems (MEMS) with piezoelectric, piezoresistive and/or capacitive components, which may be used to determine environmental conditions or location information related to the computer device 1100. In embodiments, the MEMS may include 3-axis accelerometers, 3-axis gyroscopes, and/or magnetometers. In some embodiments, the one or more sensors 1114 may also include one or more gravimeters, altimeters, barometers, proximity sensors (e.g., infrared radiation detector(s) and the like), depth sensors, ambient light sensors, thermal sensors (thermometers), ultrasonic transceivers, and/or the like.

Each of these elements, e.g., one or more processors 1102, the hardware accelerator 1103, the memory 1104, the data storage circuitry 1108 including the modules 1109, the input/output interface 1118, the one or more sensors 1114, the communication circuitry 1105 including the Tx 1111, the NIC 1112, the system bus 1106, the computer bus 1139, the device 1131, the device 1135, may perform its conventional functions known in the art. In addition, they may be employed to store and host execution of programming instructions implementing the operations associated with the reduced latency link protection technology of the present disclosure as described in connection with FIGS. 1-10, and/or other functions that provides the capability of the embodiments described in the current disclosure. The programming instructions may be assembler instructions supported by processor(s) 1102 or high-level languages, such as, for example, C, that can be compiled into such instructions. Operations associated with the device 1100 not implemented in software may be implemented in hardware, e.g., via hardware accelerator 1103.

The number, capability and/or capacity of these elements 1102-1139 may vary, depending on the number of other devices the device 1100 is configured to support. Otherwise, the constitutions of elements 1102-1139 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 12:
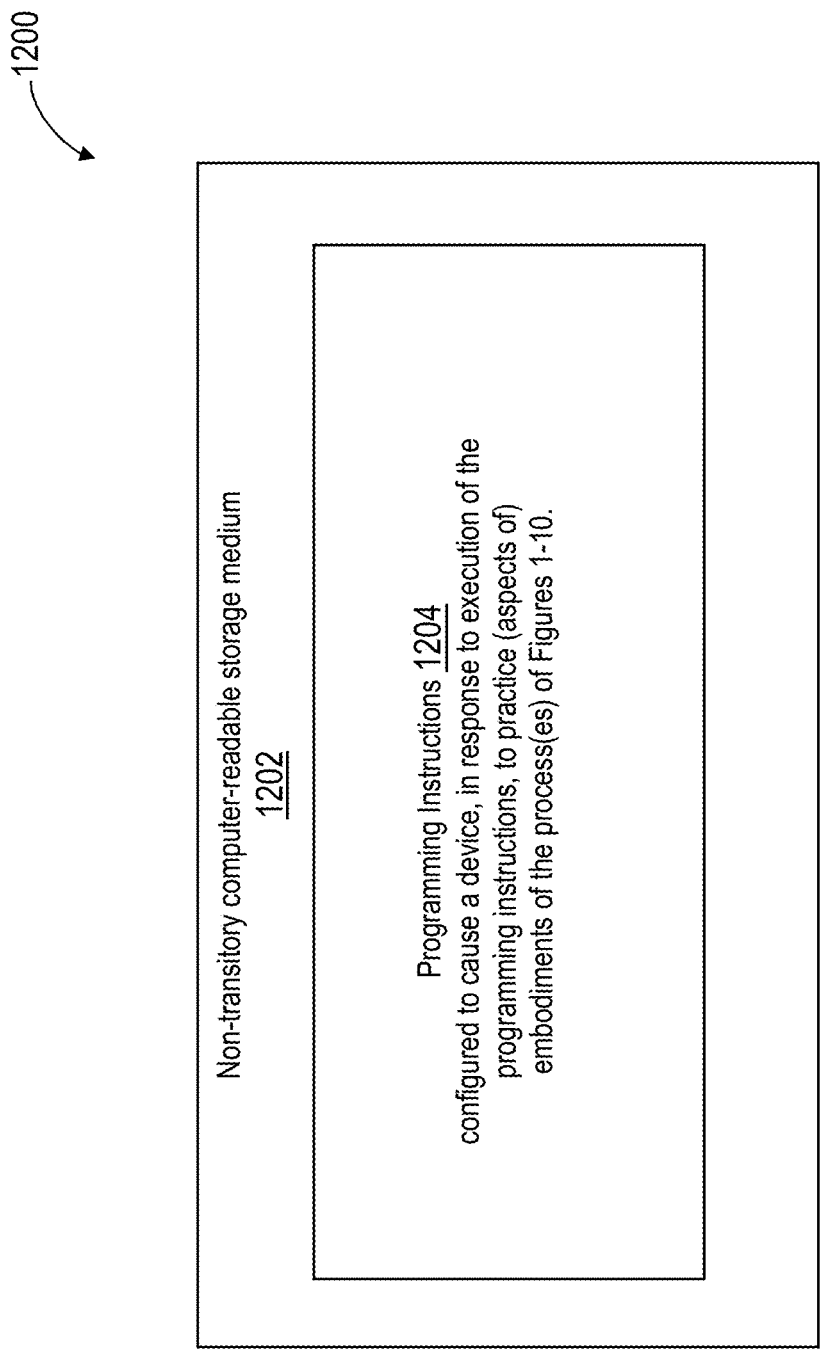
FIG. 12 illustrates a storage medium having instructions for practicing methods described with references to FIGS. 1-11, in accordance with various embodiments.

Furthermore, aspects of the present disclosure may take the form of a computer program product embodied in any tangible or non-transitory medium of expression having computer-usable program code embodied in the medium. FIG. 12 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1202 may include a number of programming instructions 1204. Programming instructions 1204 may be configured to enable a device, e.g., device 1200, in response to execution of the programming instructions, to perform, e.g., various operations associated with reduced latency link protection technology of the present disclosure, as shown in FIGS. 1-11.

In alternate embodiments, programming instructions 1204 may be disposed on multiple computer-readable non-transitory storage media 1202 instead. In alternate embodiments, programming instructions 1204 may be disposed on computer-readable transitory storage media 1202, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

EXAMPLES

Example 1 is a transmitter, comprising: a plurality of transmit queues to queue plaintext data blocks of data packets of variable sizes of a plurality of trusted execution sessions of a computing device having the transmitter, to be transmitted over a communication link; a plurality of buffers to correspondingly buffer a plurality of encryption pads to be used for encrypting the plaintext data blocks of the data packets of variable sizes of the plurality of trusted execution sessions; and encryption circuitry coupled to the plurality of transmit queues and the plurality of buffers to encrypt the plaintext data blocks of the data packets of variable sizes of the plurality of trusted execution sessions into encrypted data blocks with the encryption pads of the corresponding trust execution sessions in the plurality of buffers, consuming variable number of the encryption pads for each of the data packets corresponding to the variable size of the data packet.

Example 2 is example 1, further comprising scheduling circuitry coupled to the plurality of transmit queues and the plurality of buffers to provide a plurality of encryption keys and a plurality of encryption counter values to be routed to selected ones of the plurality of buffers corresponding to a trusted execution session to be used in generation of additional encryption pads for the selected ones of the plurality of buffers corresponding to the trusted execution session, to replace the consumed ones of the encryption pads of the selected ones the plurality of buffers corresponding to the trusted execution session, as the encryption pads of the selected ones the plurality of buffers corresponding to the trusted execution session are consumed in the encryption of the data blocks of the variable size data packets of the trusted execution session.

Example 3 is example 2, wherein the scheduling circuitry is arranged to provide the encryption counter values in a monotonically increasing manner to generate the encryption pads for the buffers of the trusted execution session; and wherein the encryption circuitry are arranged to encrypt the plaintext data blocks of the variable size data packets in accordance with Advanced Encryption Standard, Galois/Counter Mode (AES-GCM) encryption, consuming the encryption pads in the corresponding buffers of the trusted execution session, thereby providing different initialization vectors for each data block of a trusted execution session being encrypted, irrespective of which variable size data packet a data block of the trusted execution session being encrypted belongs to.

Example 4 is example 3, wherein the encryption circuitry is arranged to encrypt plaintext data blocks of a data packet of a trusted execution session greater than a data packet size threshold in sub-groups of plaintext data blocks that are smaller than the data packet size threshold; and wherein the transmitter further comprises a MAC authentication circuitry coupled with the plurality of buffers to a message authentication code (MAC) for each of the sub-groups of encrypted data blocks, and combine the at least two MACs a composite MAC for transmission with the data packet to allow a receiver of the data packet to authenticate decryption of the sub-groups of encrypted data blocks of the data packet of the trusted execution session.

Example 5 is example 4, wherein each of the variable size data packets has a packet size in a size range of 0-M bytes, the data packet size threshold is T bytes, and each plaintext data block is T/N bytes; wherein the encryption circuitry comprises N encryption engines arranged to encrypt N T/N bytes plaintext data blocks of one sub-group of plaintext data blocks of T bytes with R rounds in parallel; wherein the scheduling circuitry is arranged to provide N encryption keys and N encryption counter values to be routed to N selected ones of the plurality of buffers corresponding to the trusted execution session to be used in generation of N×R additional encryption pads for the N selected ones of the plurality of buffers corresponding to the trusted execution session, to replace the N×R consumed ones of the encryption pads of the N selected ones the plurality of buffers corresponding to the trusted execution session, as the N×R encryption pads of the N selected ones the plurality of buffers corresponding to the trusted execution session are consumed in the encryption of each group of N T/N bytes plaintext data blocks of a variable size data packet of the trusted execution session.

Example 6 is example 5, wherein M equals 1024, T equals 64, N equals 4, and R equals 14.

Example 7 is any one of examples 1-6, wherein the plurality of transmit queues are arranged to queue plaintext data blocks of data packets of variable sizes of a plurality of request types of the plurality of trusted execution sessions, to be transmitted over the communication link; wherein the plurality of buffers are arranged to correspondingly buffer a plurality of encryption pads to be used for encrypting the plaintext data blocks of the data packets of variable sizes of the plurality of request types of the plurality of trusted execution sessions; and the encryption circuitry are arranged to encrypt the plaintext data blocks of the data packets of variable sizes of the plurality of request types of the plurality of trusted execution sessions into encrypted data blocks with the encryption pads of the corresponding plurality of request types of the trust execution sessions in the plurality of buffers, consuming variable number of the encryption pads for each of the data packets corresponding to the variable size of the data packet.

Example 8 is example 7, wherein the communication link is a Peripheral Component Interconnect (PCI) communication link; the plurality of request types comprise a posted request type, a non-posted request type, and completion type; and the data packets are translation layer packets (TLPs).

Example 9 is a receiver, comprising: a plurality of receive queues to receive and queue encrypted data blocks of data packets of variable sizes for a plurality of trusted execution sessions of a computing device having the receiver, communicating over a communication link; a plurality of buffers to correspondingly buffer a plurality of decryption pads for the plurality of trusted sessions; and decryption circuitry coupled to the plurality of receive queues and the plurality of buffers to decrypt the encrypted data blocks of the data packets of variable sizes of the plurality of trusted execution sessions into plaintext data blocks, with the decryption pads for the corresponding trust execution sessions in the plurality of buffers, consuming variable number of the decryption pads for each of the data packets corresponding to the variable size of the data packet.

Example 10 is example 9, further comprising scheduling circuitry coupled to the plurality of receive queues and the plurality of buffers to provide a plurality of decryption keys and a plurality of decryption counter values to be routed to selected ones of the plurality of buffers corresponding to a trusted execution session to be used in generation of additional decryption pads for the selected ones the plurality of buffers corresponding to the trusted execution session to replace the consumed ones of the decryption pads of the selected ones the plurality of buffers corresponding to the trusted execution session, as the decryption pads of the selected ones the plurality of buffers corresponding to the trusted execution session are consumed in the decryption of the data blocks of the variable size data packets of the trusted execution session.

Example 11 is example 10, wherein the encrypted data blocks of the variable size data packets are Advanced Encryption Standard, Galois/Counter Mode (AES-GCM) encrypted using different monotonically increased encryption counter values to provide different initialization vectors for each data block of a trusted execution session to be encrypted irrespective of which variable size data packet a data block of the trusted execution session to be encrypted belongs to; and wherein the decryption counter values provided to generate the decryption pads for the buffers o of the trusted execution session are likewise monotonically increased for the trusted execution session.

Example 12 is example 11, wherein a data packet of a trusted execution session greater than a data packet size threshold is broken into at least two groups of data blocks, with the corresponding encrypted data blocks of each group having a message authentication code (MAC), and the least two MACs are combined to form a composite MAC transmitted with the data packet; and wherein the receiver further comprises MAC authentication circuitry coupled with the plurality of buffers to symmetrically generate decryption MACs for the corresponding groups of the decrypted data blocks of the data packet of the trusted execution session, and combined to decryption MACs to form a composite decryption MAC to compare with the composite MAC transmitted with the data packet to authenticate the decryption of the data packet of the trusted executed session.

Example 13 is example 12, wherein each of the variable size data packets has a packet size in a size range of 0-M bytes, the data packet size threshold is T bytes, and each encrypted data block is T/N bytes; wherein the decryption circuitry comprises N decryption engines arranged to decrypt N T/N bytes encrypted data blocks of one sub-group of encrypted data blocks of T bytes with R rounds in parallel; wherein the scheduling circuitry is arranged to provide N decryption keys and N decryption counter values to be routed to N selected ones of the plurality of buffers corresponding to the trusted execution session to be used in generation of N×R additional decryption pads for the N selected ones of the plurality of buffers corresponding to the trusted execution session, to replace the N×R consumed ones of the decryption pads of the N selected ones the plurality of buffers corresponding to the trusted execution session, as the N×R decryption pads of the N selected ones the plurality of buffers corresponding to the trusted execution session are consumed in the decryption of each group of N T/N bytes encrypted data blocks of a variable size data packet of the trusted execution session.

Example 14 is example 13, wherein M equals 1024, T equals 64, N equals 4, and R equals 14.

Example 15 is any one of examples 9-14, wherein the plurality of receive queues are arranged to queue encrypted data blocks of data packets of variable sizes of a plurality of request types of the plurality of trusted execution sessions, received over the communication link; wherein the plurality of buffers are arranged to correspondingly buffer a plurality of decryption pads to be used for decrypting the encrypted data blocks of the data packets of variable sizes of the plurality of request types of the plurality of trusted execution sessions; and the decryption circuitry are arranged to decrypt the encrypted data blocks of the data packets of variable sizes of the plurality of request types of the plurality of trusted execution sessions into plaintext data blocks with the decryption pads of the corresponding plurality of request types of the trust execution sessions in the plurality of buffers, consuming variable number of the decryption pads for each of the data packets corresponding to the variable size of the data packet.

Example 16 is example 15, wherein the communication link is a Peripheral Component Interconnect (PCI) communication link; the plurality of request types comprise a posted request type, a non-posted request type, and completion type; and the data packets are translation layer packets (TLPs).

Example 17 is a method for encrypting one or more plaintext data blocks of a data packet to be transmitted over a communication link, comprising: retrieving, by a transmitter associated with the communication link, one or more encryption pads from an encryption pad storage buffer based at least in part on a size of the data packet; encrypting, by the transmitter, the one or more plaintext data blocks of the data packet in accordance with advanced encryption standard (AES) Galois counter mode (GCM) encryption, using the one or more encryption pads retrieved, to generate one or more corresponding ciphertext data blocks; generating in parallel, while encrypting, by the transmitter, one or more encryption pads for the encryption pad storage buffer to replenish the one or more encryption pad used, using one or more monotonically increased counter values as one or more initialization vectors in the generation of the one or more replenishment encryption pads; and transmitting, by the transmitter, the one or more corresponding ciphertext data blocks over the communication link, on their generations.

Example 18 is example 17, wherein the data packet is associated with one of a plurality of trusted execution sessions of a computing device having the transmitter, and wherein the encryption pad storage buffer is correspondingly associated with the one trusted execution session.

Example 19 is example 17, wherein the data packet is of a first request type of a plurality of request types, and wherein the encryption pad storage buffer is correspondingly associated with the first request type.

Example 20 is example 17, wherein retrieving comprises retrieving n encryption pads for encrypting n data blocks in parallel; encrypting comprises encrypting the n data blocks in parallel using the n encryption pads retrieved; and generating comprises generating in parallel, while encrypting, n encryption pads to replenish the n used encryption pads, using n monotonically increased counter values for n initialization vectors.

Example 21 is any one of examples 17-20, wherein the communication link is a peripheral component interconnect (PCI) communication link, and the data packet is a transaction layer packet (TLP).

Example 22 is a method for decrypting and authenticating encrypted data blocks of a data packet received over a communication link, comprising: receiving successively, by a receiver associated with the communication link, through the communication link, a plurality of encrypted data chunks of a data packet, each encrypted data chunk having one or more encrypted data blocks; receiving, by the receiver, through the communication link, a reference message authentication code (MAC) associated with the data packet; decrypting, by the receiver, the one or more encrypted data blocks of each encrypted data chunk successively received, to generate a plurality of decrypted data chunks, each decrypted data chunk having one or more decrypted data blocks corresponding to the one or encrypted data blocks of the corresponding encrypted data chunk; generating successively, by the receiver, a message authentication code (MAC) for each decrypted data chunk, on their generations; accumulating, by the receiver, the successively generated MACs with a function to generate an accumulated MAC for the data packet; and comparing, by the receiver, the generated accumulated MAC with the reference MAC to authenticate the decrypted data packet.

Example 23 is example 22, wherein the data packet is associated with one of a plurality of trusted execution sessions of a computing device having a transmitter transmitted the data packet over the communication link, and the receiver is associated with a hardware accelerator of the computing device.

Example 24 is example 22, wherein the communication link is a peripheral component interconnect (PCI) communication link, the data packet is a transaction layer packet (TLP), and having a non-posted, posted or completion request type.

Example 25 is example 22, wherein decrypting comprises decrypting, by the receiver, the one or more encrypted data blocks of each encrypted data chunk successively received, to generate the plurality of decrypted data chunks, in accordance with advanced encryption standard (AES) Galois counter mode (GCM) decryption.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A transmitter, comprising:
    a plurality of transmit queues to queue plaintext data blocks of data packets of variable sizes of a plurality of trusted execution sessions of a computing device having the transmitter, to be transmitted over a communication link;
    a plurality of buffers to correspondingly buffer a plurality of encryption pads to be used for encrypting the plaintext data blocks of the data packets of variable sizes of the plurality of trusted execution sessions;
    encryption circuitry coupled to the plurality of transmit queues and the plurality of buffers to encrypt the plaintext data blocks of the data packets of variable sizes of the plurality of trusted execution sessions into encrypted data blocks with the encryption pads of the corresponding trust execution sessions in the plurality of buffers, consuming variable number of the encryption pads for each of the data packets corresponding to the variable size of the data packet; and
    scheduling circuitry coupled to the plurality of transmit queues and the plurality of buffers to provide a plurality of encryption keys and a plurality of encryption counter values to be routed to selected ones of the plurality of buffers corresponding to a trusted execution session to be used in generation of additional encryption pads for the selected ones of the plurality of buffers corresponding to the trusted execution session, to replace the consumed ones of the encryption pads of the selected ones the plurality of buffers corresponding to the trusted execution session, as the encryption pads of the selected ones the plurality of buffers corresponding to the trusted execution session are consumed in the encryption of the data blocks of the variable size data packets of the trusted execution session,
    wherein the scheduling circuitry is arranged to provide the encryption counter values in a monotonically increasing manner to generate the encryption pads for the buffers of the trusted execution session,
    wherein the encryption circuitry is arranged to encrypt the plaintext data blocks of the variable size data packets in accordance with Advanced Encryption Standard, Galois/Counter Mode (AES-GCM) encryption, consuming the encryption pads in the corresponding buffers of the trusted execution session, thereby providing different initialization vectors for each data block of a trusted execution session being encrypted, irrespective of which variable size data packet a data block of the trusted execution session being encrypted belongs to, wherein the encryption circuitry is further arranged to encrypt the plaintext data blocks of a data packet of a trusted execution session greater than a data packet size threshold in sub-groups of plaintext data blocks that are smaller than the data packet size threshold, and wherein the transmitter further comprises a message authentication code (MAC) authentication circuitry coupled with the plurality of buffers to a MAC for each of the sub-groups of encrypted data blocks, and combine at least two MACs in a composite MAC for transmission with the data packet to allow a receiver of the data packet to authenticate decryption of the sub-groups of encrypted data blocks of the data packet of the trusted execution session.

2. The transmitter of claim 1, wherein each of the variable size data packets has a packet size in a size range of O-M bytes, the data packet size threshold is T bytes, and each plaintext data block is T/N bytes; wherein the encryption circuitry comprises N encryption engines arranged to encrypt N T/N bytes plaintext data blocks of one sub-group of plaintext data blocks of T bytes with R rounds in parallel; wherein the scheduling circuitry is arranged to provide N encryption keys and N encryption counter values to be routed to N selected ones of the plurality of buffers corresponding to the trusted execution session to be used in generation of N×R additional encryption pads for the N selected ones of the plurality of buffers corresponding to the trusted execution session, to replace the N×R consumed ones of the encryption pads of the N selected ones the plurality of buffers corresponding to the trusted execution session, as the N×R encryption pads of the N selected ones the plurality of buffers corresponding to the trusted execution session are consumed in the encryption of each group of N T/N bytes plaintext data blocks of a variable size data packet of the trusted execution session.

3. The transmitter of claim 2, wherein M equals 1024, T equals 64, N equals 4, and R equals 14.

4. The transmitter of claim 1, wherein the plurality of transmit queues are arranged to queue plaintext data blocks of data packets of variable sizes of a plurality of request types of the plurality of trusted execution sessions, to be transmitted over the communication link; wherein the plurality of buffers are arranged to correspondingly buffer a plurality of encryption pads to be used for encrypting the plaintext data blocks of the data packets of variable sizes of the plurality of request types of the plurality of trusted execution sessions; and the encryption circuitry are arranged to encrypt the plaintext data blocks of the data packets of variable sizes of the plurality of request types of the plurality of trusted execution sessions into encrypted data blocks with the encryption pads of the corresponding plurality of request types of the trust execution sessions in the plurality of buffers, consuming variable number of the encryption pads for each of the data packets corresponding to the variable size of the data packet.

5. The transmitter of claim 4, wherein the communication link is a Peripheral Component Interconnect (PCI) communication link; the plurality of request types comprise a posted request type, a non-posted request type, and completion type; and the data packets are translation layer packets (TLPs).

6. A receiver, comprising:
a plurality of receive queues to receive and queue encrypted data blocks of data packets of variable sizes for a plurality of trusted execution sessions of a computing device having the receiver, communicating over a communication link;
a plurality of buffers to correspondingly buffer a plurality of decryption pads for the plurality of trusted sessions;
decryption circuitry coupled to the plurality of receive queues and the plurality of buffers to decrypt the encrypted data blocks of the data packets of variable sizes of the plurality of trusted execution sessions into plaintext data blocks, with the decryption pads for the corresponding trust execution sessions in the plurality of buffers, consuming variable number of the decryption pads for each of the data packets corresponding to the variable size of the data packet; and
scheduling circuitry coupled to the plurality of receive queues and the plurality of buffers to provide a plurality of decryption keys and a plurality of decryption counter values to be routed to selected ones of the plurality of buffers corresponding to a trusted execution session to be used in generation of additional decryption pads for the selected ones the plurality of buffers corresponding to the trusted execution session to replace the consumed ones of the decryption pads of the selected ones the plurality of buffers corresponding to the trusted execution session, as the decryption pads of the selected ones the plurality of buffers corresponding to the trusted execution session are consumed in the decryption of the data blocks of the variable size data packets of the trusted execution session, wherein the encrypted data blocks of the variable size data packets are Advanced Encryption Standard, Galois/Counter Mode (AES-GCM) encrypted using different monotonically increased encryption counter values to provide different initialization vectors for each data block of a trusted execution session to be encrypted irrespective of which variable size data packet a data block of the trusted execution session to be encrypted belongs to; and wherein the decryption counter values provided to generate the decryption pads for the buffers of the trusted execution session are likewise monotonically increased for the trusted execution session wherein a data packet of a trusted execution session greater than a data packet size threshold is broken into at least two groups of data blocks, with the corresponding encrypted data blocks of each group having a message authentication code (MAC), and at least two MACs are combined to form a composite MAC transmitted with the data packet and wherein the receiver further comprises MAC authentication circuitry coupled with the plurality of buffers to symmetrically generate decryption MACs for the corresponding groups of the decrypted data blocks of the data packet of the trusted execution session, and combined to decryption MACs to form a composite decryption MAC to compare with the composite MAC transmitted with the data packet to authenticate the decryption of the data packet of the trusted executed session.

7. The receiver of claim 6, wherein each of the variable size data packets has a packet size in a size range of 0-M bytes, the data packet size threshold is T bytes, and each encrypted data block is T/N bytes; wherein the decryption circuitry comprises N decryption engines arranged to decrypt N T/N bytes encrypted data blocks of one sub-group of encrypted data blocks of T bytes with R rounds in parallel; wherein the scheduling circuitry is arranged to provide N decryption keys and N decryption counter values to be routed to N selected ones of the plurality of buffers corresponding to the trusted execution session to be used in generation of N×R additional decryption pads for the N selected ones of the plurality of buffers corresponding to the trusted execution session, to replace the N×R consumed ones of the decryption pads of the N selected ones the plurality of buffers corresponding to the trusted execution session, as the N×R decryption pads of the N selected ones the plurality of buffers corresponding to the trusted execution session are consumed in the decryption of each group of N T/N bytes encrypted data blocks of a variable size data packet of the trusted execution session.

8. The receiver of claim 7, wherein M equals 1024, T equals 64, N equals 4, and R equals 14.

9. The receiver of claim 6, wherein the plurality of receive queues are arranged to queue encrypted data blocks of data packets of variable sizes of a plurality of request types of the plurality of trusted execution sessions, received over the communication link; wherein the plurality of buffers are arranged to correspondingly buffer a plurality of decryption pads to be used for decrypting the encrypted data blocks of the data packets of variable sizes of the plurality of request types of the plurality of trusted execution sessions; and the decryption circuitry are arranged to decrypt the encrypted data blocks of the data packets of variable sizes of the plurality of request types of the plurality of trusted execution sessions into plaintext data blocks with the decryption pads of the corresponding plurality of request types of the trust execution sessions in the plurality of buffers, consuming variable number of the decryption pads for each of the data packets corresponding to the variable size of the data packet.

10. The receiver of claim 9, wherein the communication link is a Peripheral Component Interconnect (PCI) communication link; the plurality of request types comprise a posted request type, a non-posted request type, and completion type; and the data packets are translation layer packets (TLPs).

* * * * *